(12) United States Patent
Ioannou

(10) Patent No.: US 9,047,575 B2
(45) Date of Patent: Jun. 2, 2015

(54) CREATIVE PROCESS MODELING AND TRACKING SYSTEM

(75) Inventor: Andrew Ioannou, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1058 days.

(21) Appl. No.: 12/435,209

(22) Filed: May 4, 2009

(65) Prior Publication Data

US 2010/0280883 A1 Nov. 4, 2010

(51) Int. Cl.
*G06F 15/16* (2006.01)
*G06F 17/22* (2006.01)
*G06Q 10/06* (2012.01)

(52) U.S. Cl.
CPC ........ *G06Q 10/06* (2013.01); *G06Q 10/063114* (2013.01)

(58) Field of Classification Search
USPC .......................................................... 705/31
See application file for complete search history.

(56) References Cited

U.S. PATENT DOCUMENTS

| | | | |
|---|---|---|---|
| 7,051,045 B2 * | 5/2006 | Cirinna et al. ............... | 705/7.26 |
| 7,072,940 B1 * | 7/2006 | Day et al. ...................... | 709/204 |
| 7,099,803 B1 * | 8/2006 | Rappoport et al. ............... | 703/1 |
| 7,162,427 B1 * | 1/2007 | Myrick et al. ................. | 705/348 |
| 7,188,333 B1 * | 3/2007 | LaMotta et al. .............. | 717/106 |
| 7,337,124 B2 * | 2/2008 | Corral ........................... | 705/7.17 |
| 7,346,534 B1 * | 3/2008 | Martin et al. ................. | 705/7.22 |
| 7,729,933 B2 * | 6/2010 | Ye et al. ........................ | 705/7.11 |
| 7,778,856 B2 * | 8/2010 | Reynolds et al. ............. | 705/7.28 |
| 7,805,327 B1 * | 9/2010 | Schulz et al. ................. | 705/7.26 |
| 7,930,678 B2 * | 4/2011 | Tian et al. ..................... | 717/105 |
| 7,991,669 B2 * | 8/2011 | Flaxer et al. ................. | 705/36 R |
| 2002/0052807 A1 * | 5/2002 | Han et al. ......................... | 705/27 |
| 2002/0062262 A1 * | 5/2002 | Vasconi et al. ................. | 705/26 |
| 2002/0188486 A1 * | 12/2002 | Gil et al. ............................ | 705/7 |
| 2003/0033191 A1 * | 2/2003 | Davies et al. ................... | 705/10 |
| 2003/0033311 A1 * | 2/2003 | Skinner ......................... | 707/100 |
| 2003/0074247 A1 * | 4/2003 | Dick et al. ......................... | 705/9 |
| 2003/0083923 A1 * | 5/2003 | Guicciardi et al. ............... | 705/9 |
| 2003/0097286 A1 * | 5/2003 | Skeen ............................... | 705/7 |
| 2003/0139954 A1 * | 7/2003 | Chung et al. ...................... | 705/7 |
| 2003/0187707 A1 * | 10/2003 | Hack et al. ....................... | 705/7 |
| 2003/0188290 A1 * | 10/2003 | Corral ........................... | 717/101 |
| 2003/0191674 A1 * | 10/2003 | Hale et al. ........................ | 705/7 |
| 2004/0002885 A1 * | 1/2004 | Levy ................................. | 705/8 |
| 2004/0078258 A1 * | 4/2004 | Schulz et al. ..................... | 705/9 |
| 2004/0098292 A1 * | 5/2004 | Miller et al. ...................... | 705/8 |
| 2004/0181417 A1 * | 9/2004 | Piller et al. ....................... | 705/1 |
| 2004/0187089 A1 * | 9/2004 | Schulz ........................... | 717/101 |
| 2004/0236673 A1 * | 11/2004 | Eder ............................... | 705/38 |
| 2005/0008163 A1 * | 1/2005 | Leser et al. .................... | 380/281 |
| 2005/0021348 A1 * | 1/2005 | Chan et al. ....................... | 705/1 |
| 2005/0065970 A1 * | 3/2005 | King et al. .................... | 707/102 |
| 2005/0096951 A1 * | 5/2005 | Ye et al. ........................... | 705/7 |
| 2005/0114829 A1 * | 5/2005 | Robin et al. .................. | 717/101 |
| 2005/0149342 A1 * | 7/2005 | Chao et al. ....................... | 705/1 |

(Continued)

Primary Examiner — Ashford S Hayles
(74) Attorney, Agent, or Firm — Miles & Stockbridge P.C.

(57) ABSTRACT

One embodiment is a system that allows multiple entities to track a process for developing a product. The system receives a process defined in terms of the entities, which are involved in the process, and the relationships, which exist among the entities. The system permits a process instance to be created from the defined process upon deeming that the process is valid, and permits the first process instance to be tracked with respect to requirements and solutions that are specified by entities in the process instance.

16 Claims, 16 Drawing Sheets

(56) References Cited

U.S. PATENT DOCUMENTS

| | | | |
|---|---|---|---|
| 2005/0209732 A1* | 9/2005 | Audimoolam et al. | 700/216 |
| 2005/0228522 A1* | 10/2005 | Matheson | 700/97 |
| 2006/0004619 A1* | 1/2006 | Matheson | 705/8 |
| 2006/0069658 A1* | 3/2006 | Haller et al. | 705/78 |
| 2006/0173726 A1* | 8/2006 | Hall et al. | 705/8 |
| 2006/0174190 A1* | 8/2006 | Gomes et al. | 715/511 |
| 2007/0038494 A1* | 2/2007 | Kreitzberg et al. | 705/8 |
| 2007/0038893 A1* | 2/2007 | Junghans et al. | 714/30 |
| 2007/0099162 A1* | 5/2007 | Sekhar | 434/323 |
| 2008/0033888 A1* | 2/2008 | Flaxer et al. | 705/36 R |
| 2008/0046472 A1* | 2/2008 | Gomes et al. | 707/104.1 |
| 2008/0255881 A1* | 10/2008 | Bone | 705/3 |
| 2008/0270210 A1* | 10/2008 | Kratschmer et al. | 705/7 |
| 2008/0319811 A1* | 12/2008 | Casey | 705/7 |
| 2009/0024514 A1* | 1/2009 | Kumaran et al. | 705/37 |
| 2009/0112655 A1* | 4/2009 | Stuhec et al. | 705/7 |
| 2009/0125359 A1* | 5/2009 | Knapic et al. | 705/8 |
| 2009/0138309 A1* | 5/2009 | Reynolds et al. | 705/7 |
| 2009/0300586 A1* | 12/2009 | Bernardini et al. | 717/126 |
| 2010/0004962 A1* | 1/2010 | Erickson et al. | 705/7 |
| 2010/0280962 A1* | 11/2010 | Chan | 705/301 |
| 2011/0125544 A1* | 5/2011 | Shtub | 705/7.23 |

* cited by examiner

Fig. 12

*Creative Process Tracker – Edit Component* — 1200

1210:

Component Name: View the calendar of another user

Component #: 6

Version: 3

Component Description:
When a user wishes to create an appointment they may need to understand the availability of other users. Therefore the user needs to be able to see other user's calendars. It must be easy for the user to switch back and forth between different user's calendars

1220:

Component History

| Version | Component Author | Version Date |
|---|---|---|
| 1 | Samuel Plover | 1/1/08 |
| 2 | Samuel Plover | 2/1/08 |
|  |  |  |

1230: Relationships involving component

| # | Business Requirement Components | Functional Specification Components | Relationship Type | Status | Proposer | Proposal Date | Accepted By | Acceptance Date |
|---|---|---|---|---|---|---|---|---|
| 5 | 6 | 8,9 | Full Solution | Accepted | Samantha Marland | 3/2/08 | Samuel Plover | 3/14/08 |
|  |  |  |  |  |  |  |  |  |
|  |  |  |  |  |  |  |  |  |
|  |  |  |  |  |  |  |  |  |

— 1232

[Update]

CREATIVE PROCESS MODELING AND TRACKING SYSTEM

FIELD OF THE INVENTION

One embodiment is directed generally to a computer, and in particular to a computerized modeling and tracking system.

BACKGROUND INFORMATION

Generally, a process for creating a product involves a number of different entities with differing expertise. For example, these entities may include a business team, an engineering team, and a documentation team. In many cases, one team may outline requirements, which are to be solved by another team. In order to ensure that these requirements are met, team leaders may meet and provide a "formal handoff." This formal handoff may include a number of meetings in which one entity inspects the solution, thinks of omissions, and provides feedback to another entity.

Such a formal handoff between entities may be error prone, inefficient, and subjective. In addition, changes that may occur during the process may not be communicated to every team, which may be directly or indirectly affected by such changes. Furthermore, even in the case where entities have employed a manual cross check between different documents or components to ensure that the requirements are satisfied, this type of activity is time consuming, error prone, and difficult to maintain.

SUMMARY

One embodiment is a system that allows multiple entities to track a process for developing a product. The system receives a process defined in terms of the entities, which are involved in the process, and the relationships, which exist among the entities. The system determines if the process is valid. The system permits a process instance to be created from the defined process upon deeming that the process is valid, and permits the process instance to be tracked with respect to requirements and solutions that are specified by entities in the process instance.

BRIEF DESCRIPTION OF THE DRAWINGS

FIG. 12 is a diagram illustrating a user interface to edit a component in accordance with one embodiment.

DETAILED DESCRIPTION

One embodiment is a system that enables a user to model the relation between all distinct entities involved in a process for creating a product, and to track a number of aspects associated with creating a product. These aspects may include a state at which a number of requirements, specified by one entity, have been solved by components, proposed by another entity.

To aid in the understanding of the present disclosure, a number of examples are given with respect to a software process for creating a product, such as a software program. However, the present disclosure is not limited to modeling and tracking software processes, but may encompass any type of process and/or service, involving multiple entities.

In general, the present disclosure may be relevant to any creative process that includes several steps, which may be managed by different groups and/or which may be based upon different roles. To illustrate, the present disclosure may be applied, for example, to a process relating to the creation of consumer electronic products. Typically, such a process may involve business strategists to set high level requirements, and a group of individuals to implement those requirements. The group of individuals may include a software team, a firmware team, a hardware team, and a design team.

As discussed, the present disclosure may be applicable to a variety of processes. To further illustrate, other non-limiting examples may include a process for constructing a home or a process for drafting a patent application.

Figure 1:
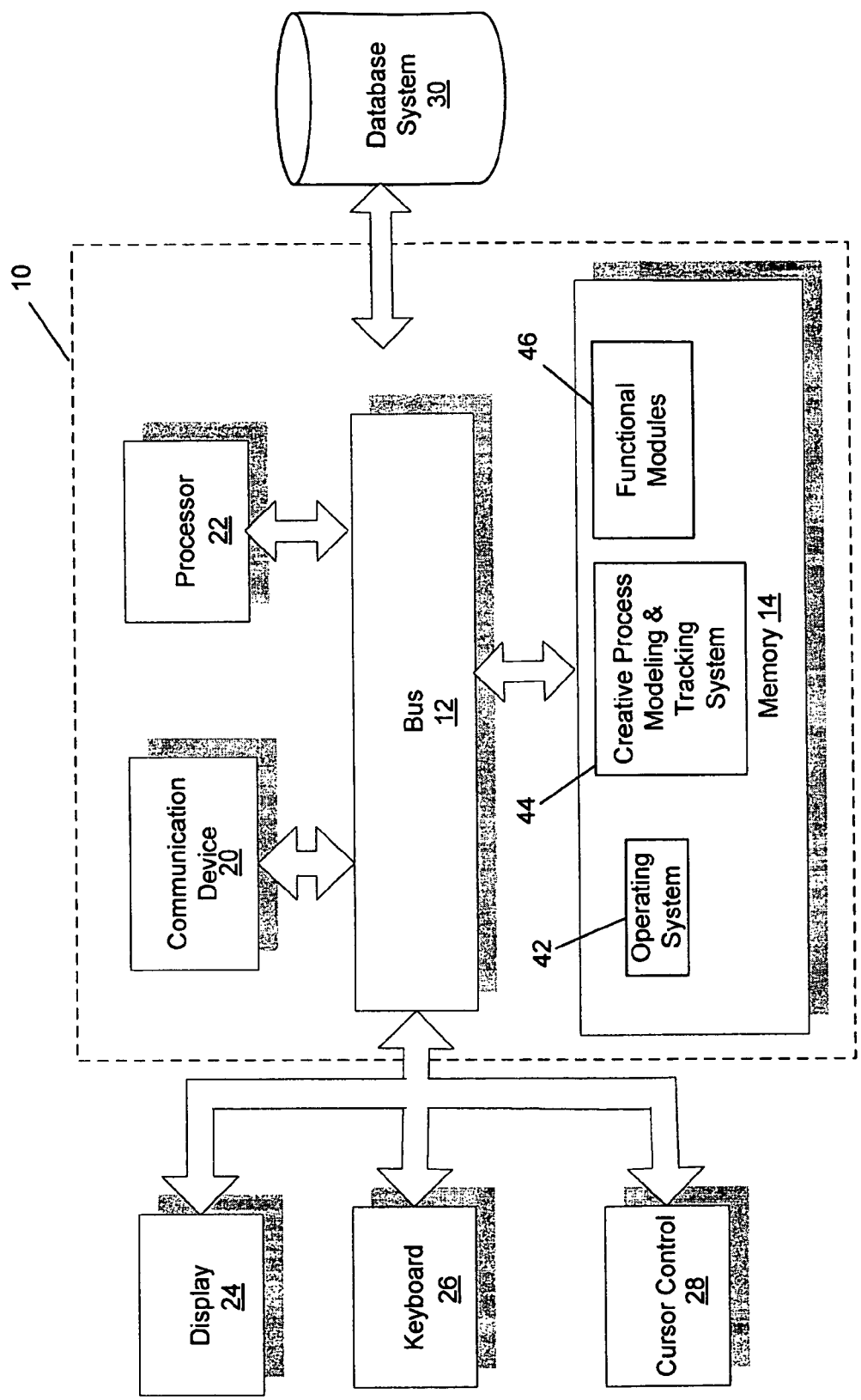
FIG. 1 is a block diagram of a system that is configured to implement an embodiment of the present invention.

FIG. 1 is a block diagram of a system 10 that can implement an embodiment. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. A user may interface with system 10 directly, or remotely through a network or any other method. Database system 30, coupled to bus 12, is used to store data for various modules.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. Modules include an operating system 42 that provides operating system functionality for system 10. Modules further include a creative process modeling and tracking system 44 ("system 44"), which is enabled to model and track a creative process, as disclosed in more detail below. Modules may include other functional modules 46, which may integrate or interact with system 44. As an example, functional module 46 may include a document management system ("DMS"). The DMS may store and version components.

Functional module 46 may include project management software. Project management software may include timeline information extracted from a project plan held in external project management software for the product being created. This timeline information may be used to generate alerts and/or notifications in cases, where at least one of an entity's requirements is not completely solved as a deadline for the entity in question approaches.

For example, when functional module 46 includes project management software, this may allow a component to be linked to a line item in a project plan. To illustrate, component #3 ("Add Appointment Dialog" of the Functional Specification level) of FIG. 7 may be linked to an item in a project plan. Once this link has been established, system 44 may be able to utilize and communicate information, such as the start/stop times of an activity or the estimated duration of an activity. This information (e.g., estimated duration of line items in the project plan that are linked to a component) may be used to derive a total amount of time that the project plan may spend on one level or on a single product (i.e., all levels). The total amount of time may be included in one of the UIs (e.g., process instance UI 250) of creative process tracker 220.

Functional module 46 may include communications, collaboration, and/or social networking software. These types of software may facilitate or allow an entity to instant message, email, telephone, check the availability of, and/or schedule meetings with the resource in question, since system 44 involves working with multiple entities to agree on whether certain components are deemed to be valid and full solutions to the requirements. In other embodiments, creative process modeling and tracking system 44 may be a stand-alone system, or may be part of any other system.

Figure 2:
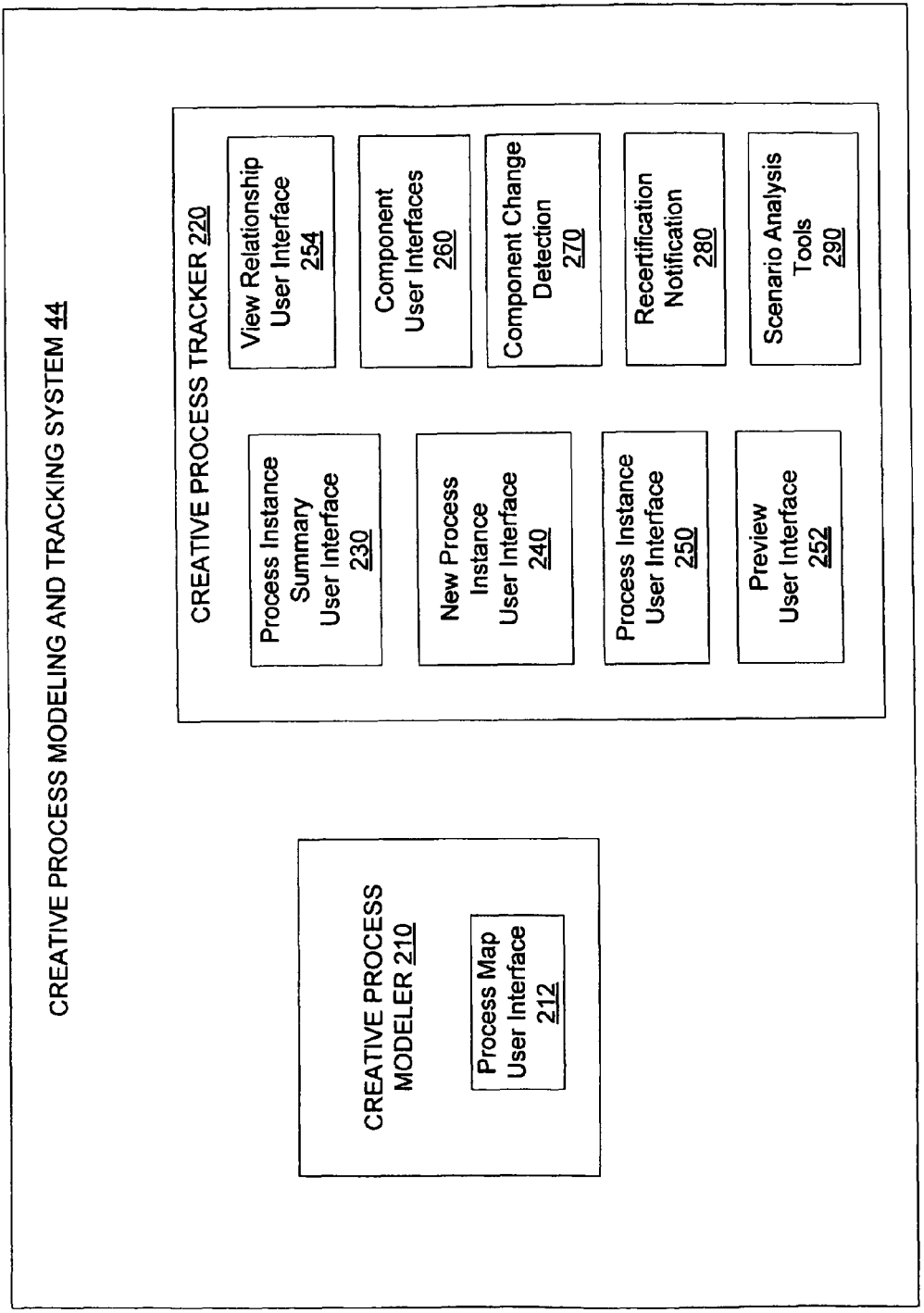
FIG. 2 is a block diagram illustrating the creative process modeling and tracking system in accordance with one embodiment.

FIG. 2 is a block diagram of a creative process modeling and tracking system 44 in accordance with one embodiment. Creative process modeling and tracking system 44 ("system 44") includes creative process modeler 210 and creative process tracker 220.

Creative process modeler 210 allows an entity, such as a user, to define a process associated with producing and/or developing a product. Creative process modeler 210 includes a module that enables a user to define a creative process. This module may include a process map user interface 212 ("process map UI 212").

Creative process tracker 220 allows an entity to create instances of a product and track the creation of the product through all levels of a creative process, defined, for example, by a process map. Creative process tracker 220 provides an entity with the ability to check that all of the demands of one level have been satisfied by another level. Creative process tracker 220 allows a number of changes to be made to the content of any level, and provides instant feedback regarding the upstream and downstream consequences of those changes.

Creative process tracker 220 may be implemented using a number of modules and/or sub-components, such as a process instance summary user interface 230 ("process instance summary UI 230"), a new process instance user interface 240 ("new process instance UI 240"), a process instance user interface 250 ("process instance UI 250"), a preview user interface ("preview UI 252"), a view relationship user interface ("view relationship UI 254"), components user interfaces 260 ("components UIs 260"), a component change detection module 270, a recertification notification module 280, and scenario analysis tools 290. Each of these modules is described in more detail below.

Although creative process modeling and tracking system 44 may include a number of distinct modules, as illustrated in FIG. 2, it should be recognized that some modules may be combined, and/or some functions may be performed by one or more modules. Therefore, the embodiment of FIG. 2 represents the major components of creative process modeling and tracking system 44, but these components may be combined or divided depending on the particular design.

Figure 3:
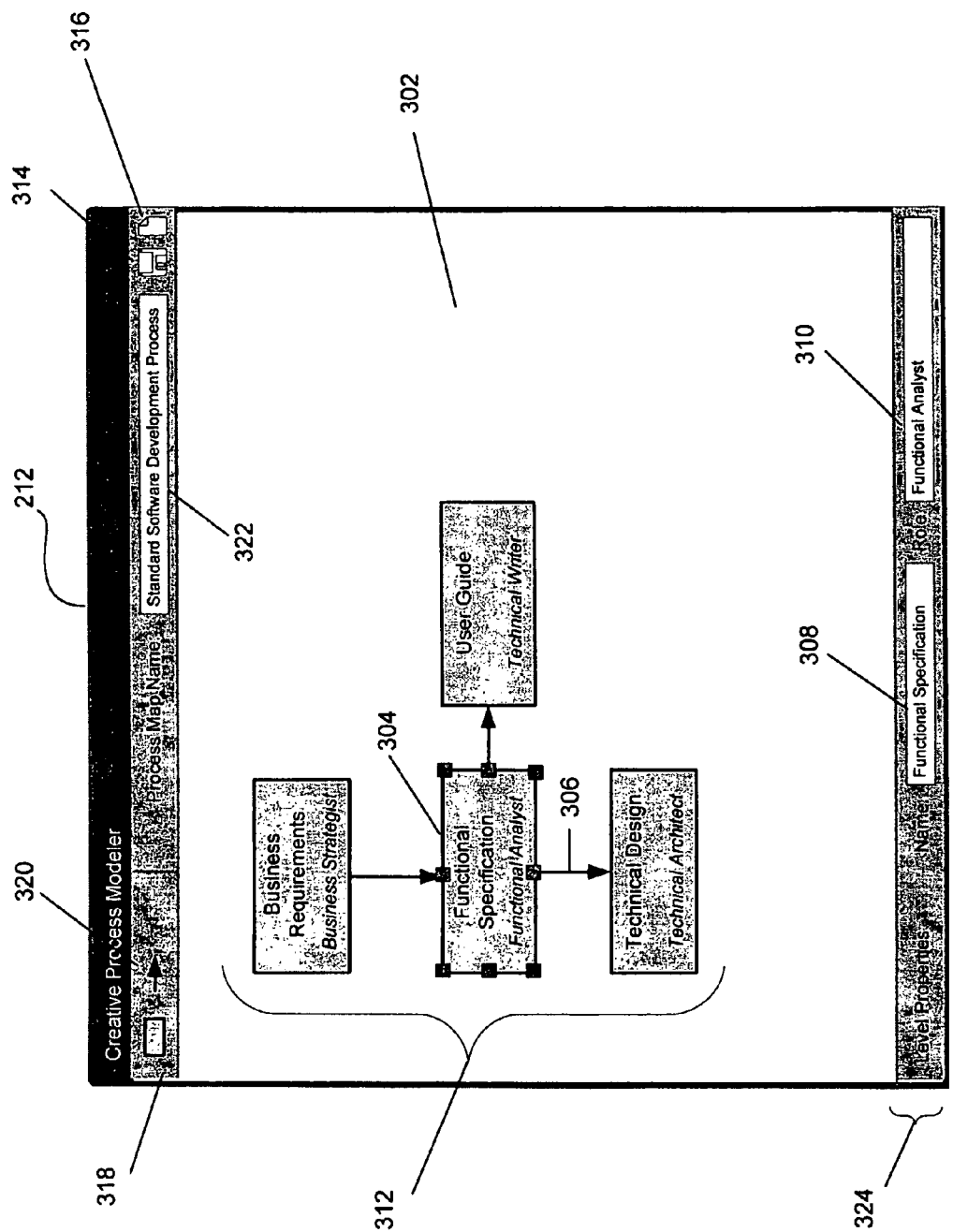
FIG. 3 is a diagram illustrating a process map user interface in accordance with one embodiment.

FIG. 3 is a diagram illustrating a process map UI 212 of the creative process modeler 210 of FIG. 2 in accordance with one embodiment. Process map UI 212 includes a process map development area 302, which may be used to define a process, involved in creating a product. In one embodiment, a process may be defined in terms of a process map 312.

A process map provides a visual representation of the levels, which are involved in a process, and any relationships that may exist between the levels. A level, generally, refers to an entity that is responsible for a particular aspect of the overall product, and has distinct requirements and/or distinct solutions. In process map 312, a level may include an entity, represented by an entity name 308 and a general role 310. In addition, process map 312 may specify the roles of users, who belong to those levels. Roles may be defined through a security system that restricts access to authorized users, such as Role Based Access Control ("RBAC") system.

In one embodiment, process map UI 212 allows a user to create a level by selecting and/or dragging a new process level 318 into the process map development area 302. In addition, process map UI 212 allows a user to specify an entity and/or role for the level. This may be performed by selecting the level 304, and then entering the information into the graphical representation of the level 304 itself, or entering the information into editor 324.

A relationship, generally, refers to a known association or relation among entities. In process map 312, a relationship may be defined, for example, by connecting levels. Arrow 306 may represent the nature of the relationship, which exists between levels. A level, where an arrow originates, is considered to be a "prior level" to the level, where the arrow enters. Generally, a "prior level" is responsible for setting the requirements, which a "subsequent level" is responsible for solving. The subsequent level may provide the actual solution to a requirement. Additionally or alternatively, the subsequent level may solve a requirement, for example, by delegating some of the responsibility to at least one other level, or by restating at least one of the requirements for another level to solve.

As an example, FIG. 3 illustrates a process map 312, named "Standard Software Development Process" 322, which has been created in the creative process development area 302. As indicated by the process map name 322, process map 312 defines a process associated with creating a particular piece of software. Process map 312 includes the following levels: Business Requirements level, Functional Specification level, User Guide level, and Technical Design level. As defined by process map 312, Business Requirements level includes a Business Strategist role; Functional Specification includes a Functional Analyst role; User Guide includes a Technical Writer role; and Technical design includes a Technical Architect role. Process map 312 indicates that Functional Specification level is currently selected, and its properties are displayed in the editor 324. Process map 312 defines a process in which the Business Requirements level may specify a number of requirements for the Functional Specification level to solve, while the Functional Specification level may specify a number of requirements for the User Guide and the Technical Design, respectively, to solve.

Creative process modeler 210 allows a user to create a number of different process maps. Selecting option 316 allows a user to create a new process map. A user may save the current process development area 302 at any point in time by selecting save option 314.

Once a process map has been saved, creative process modeler 210 allows a user to be able modify the process at a later time, or to create a new process from the saved process by using the saved process as a template.

Figure 4B:
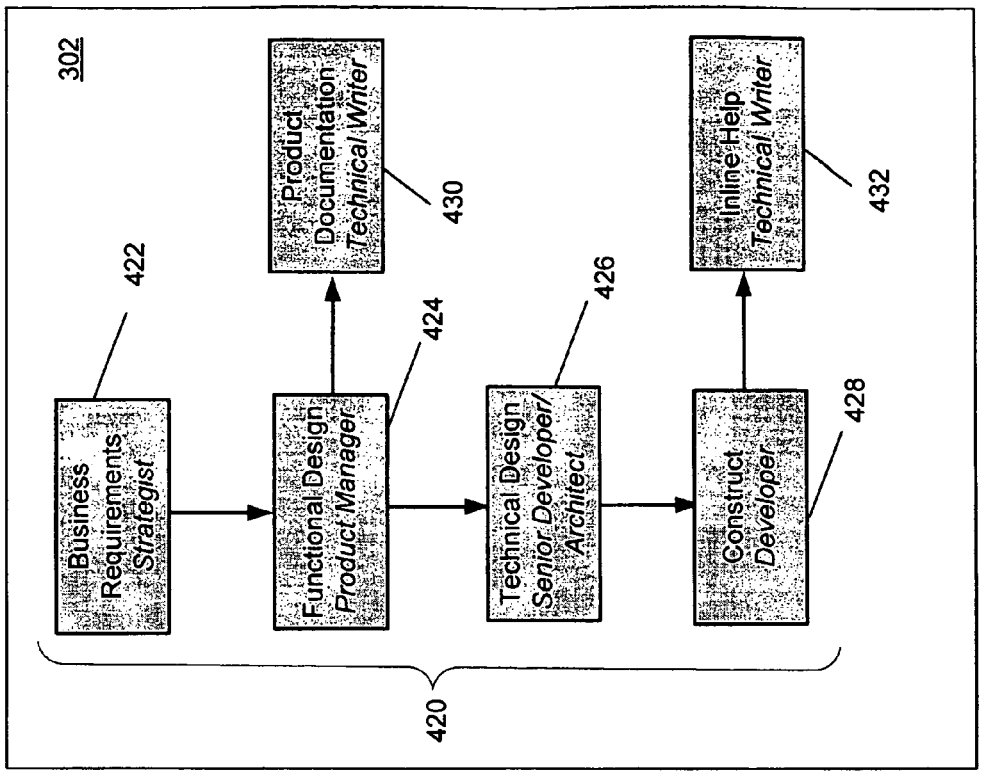
FIGS. 4A and 4B illustrate exemplary process maps, which may be created using the creative process modeler in accordance with one embodiment.
Figure 4A:
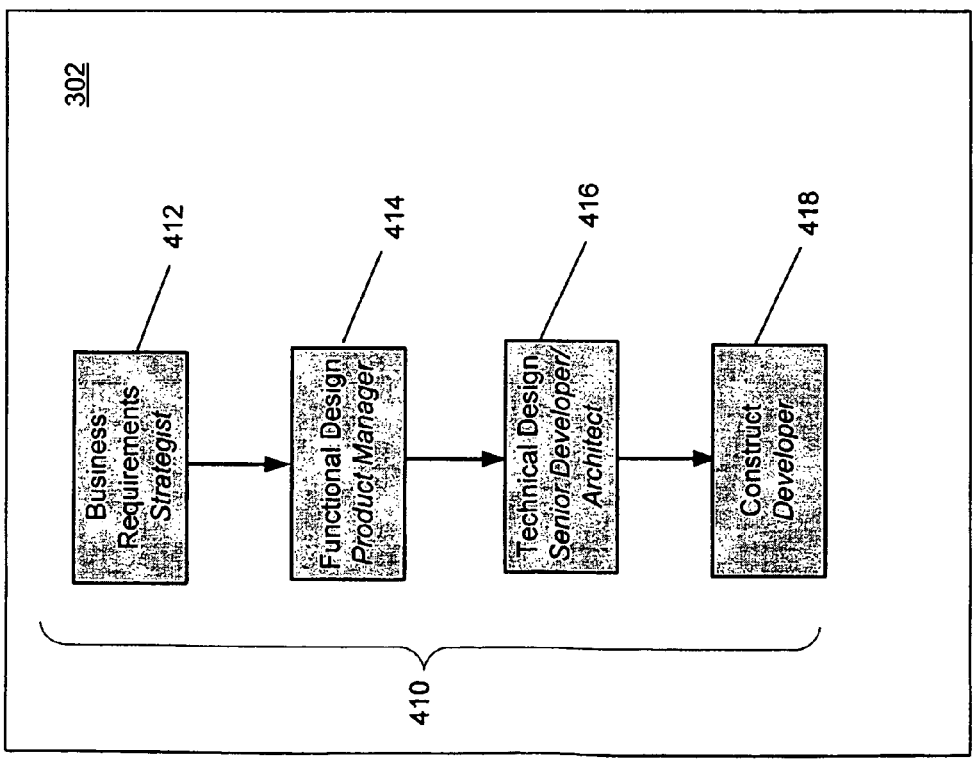

FIGS. 4A and 4B illustrate exemplary process maps that have been created via the creative process modeler 210. FIG. 4A illustrates a process map 410, named "Software Process I," which includes a Business Requirements level 412, a Functional Design level 414, a Technical Design level 416, and a Construct level 418. FIG. 4B illustrates a process map 420, named "Software Process II," which includes substantially the same levels (e.g., Business Requirements level 422, Functional Design level 424, Technical Design level 426, Construct level 428) as Software Process I, but also includes a Product Documentation level 430 and an Inline Help level 432.

In this example, the process map author used Software Process I, as a starting template to create a new process map, Software Process II. Alternatively, the process map author may create Software Process II without using Software Process I, as a starting template. Software Process II is defined as a software development process that is similar to the process outlined in Software Process I, but further includes a Product Documentation level 430 and an Inline Help level 432. According to the Software Process II map, Product Documentation 430 must cover substantially all of the requirements detailed in Functional Design 424, while In-line Help 432 must cover substantially all of the requirements produced in Construct 428.

As illustrated by the exemplary maps discussed above, creative process modeler 210 allows a user to define a creative process in terms of the entities and relationships involved in creating a particular product. Creative process modeler 210 allows a user to define processes, possessing different gradients of simplicity or complexity.

Once a process for developing a product is established via creative process modeler 210, this same process may be utilized in developing a number of software instances and/or products, which involve the same levels and relationships. In addition, a user may track these instances using creative process tracker 220.

Figure 5:
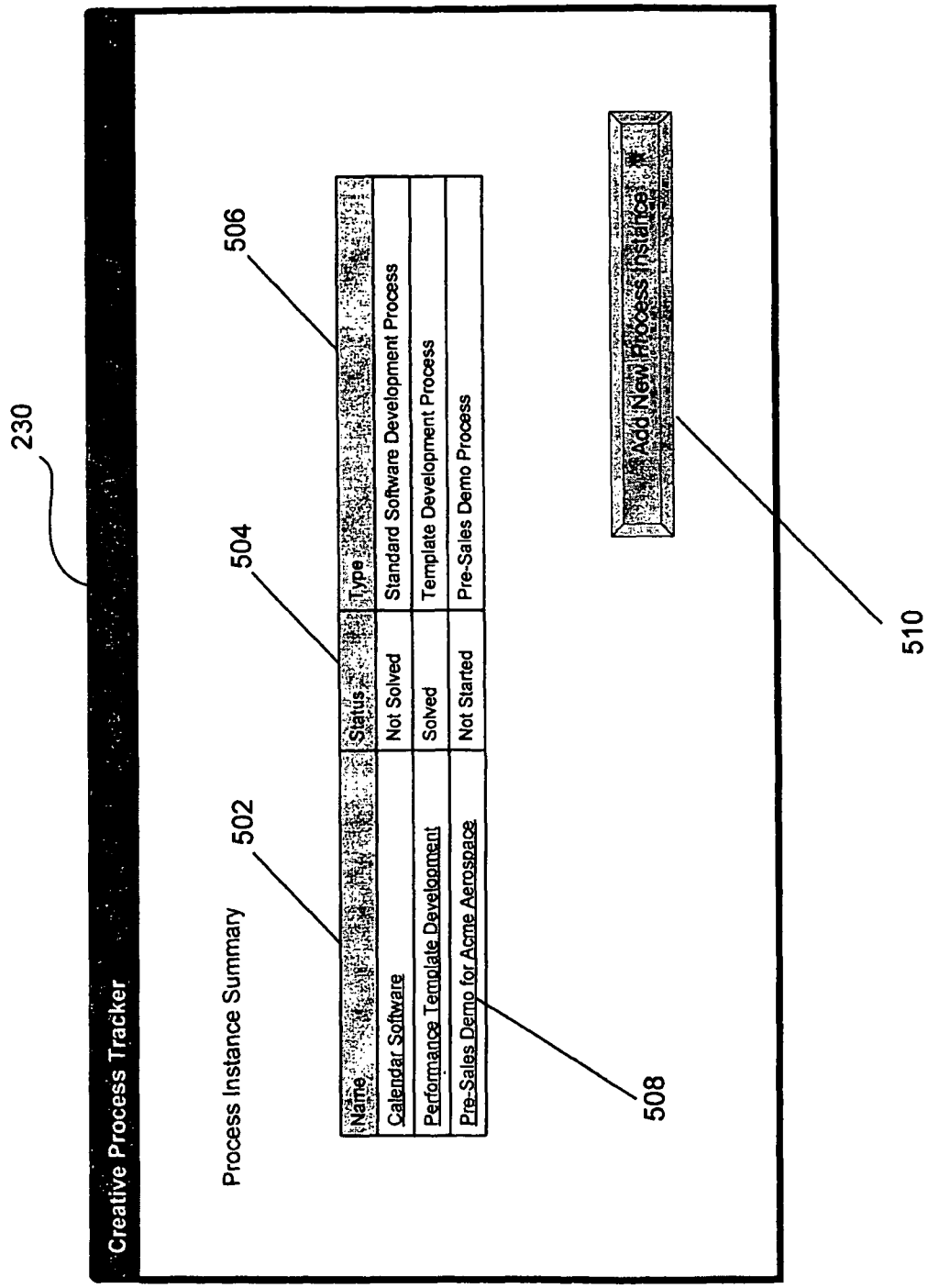
FIG. 5 is a diagram illustrating a process instance summary user interface in accordance with one embodiment.

FIG. 5 is a diagram illustrating a process instance summary UI 230 in accordance with one embodiment. Process instance summary UI 230 displays a number of process instances, and provides an overall status report for each process instance. Process instance summary UI 230 provides a quick reference, indicating whether the current overall status of a given instance, which is being tracked, is deemed to be completely solved with respect to all requirements according to all of the entities involved in the process.

Figure 7:
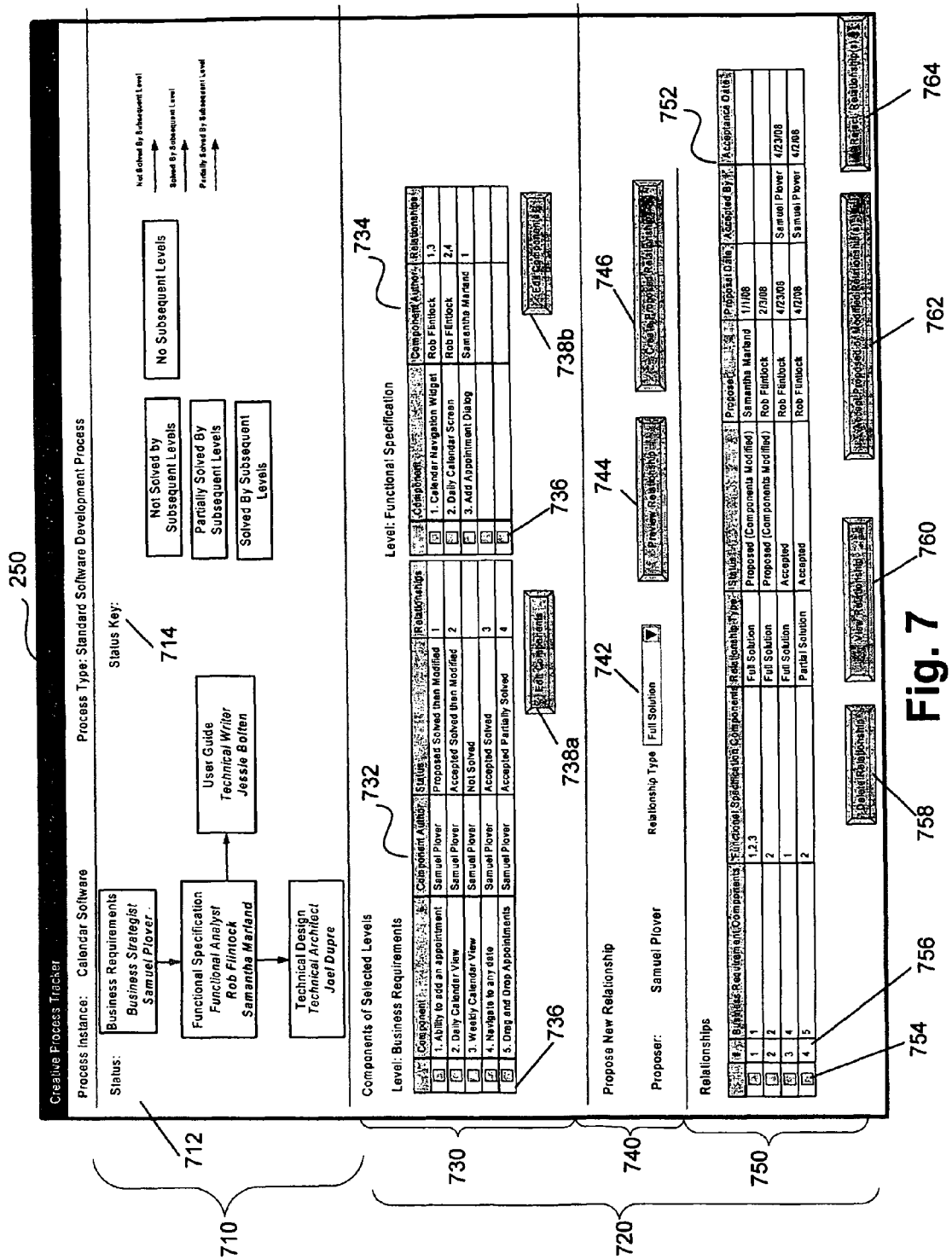
FIG. 7 is a diagram illustrating a process instance user interface in accordance with one embodiment.

Process instance summary UI 230 displays a number of process instances, which may be tracked. Each process instance may be referenced by a process name 502. Process name 502 may include a hyperlink 508. Hyperlink 508 provides direct access to a process instance screen, as shown in FIG. 7. A status 504 is provided for each creative process instance 502. Status 504 indicates the degree to which all levels of a particular process are solved. Process instance summary UI 230 may indicate which creative process model (or process map) is being used for each process instance in a corresponding process type 506 field.

A new process instance may be added by activating an "Add New Process Instance" button 510 on the process instance summary UI 230. The "Add New Process Instance" button 510 provides access to UI 240 of FIG. 6 to add a new process instance.

Figure 6:
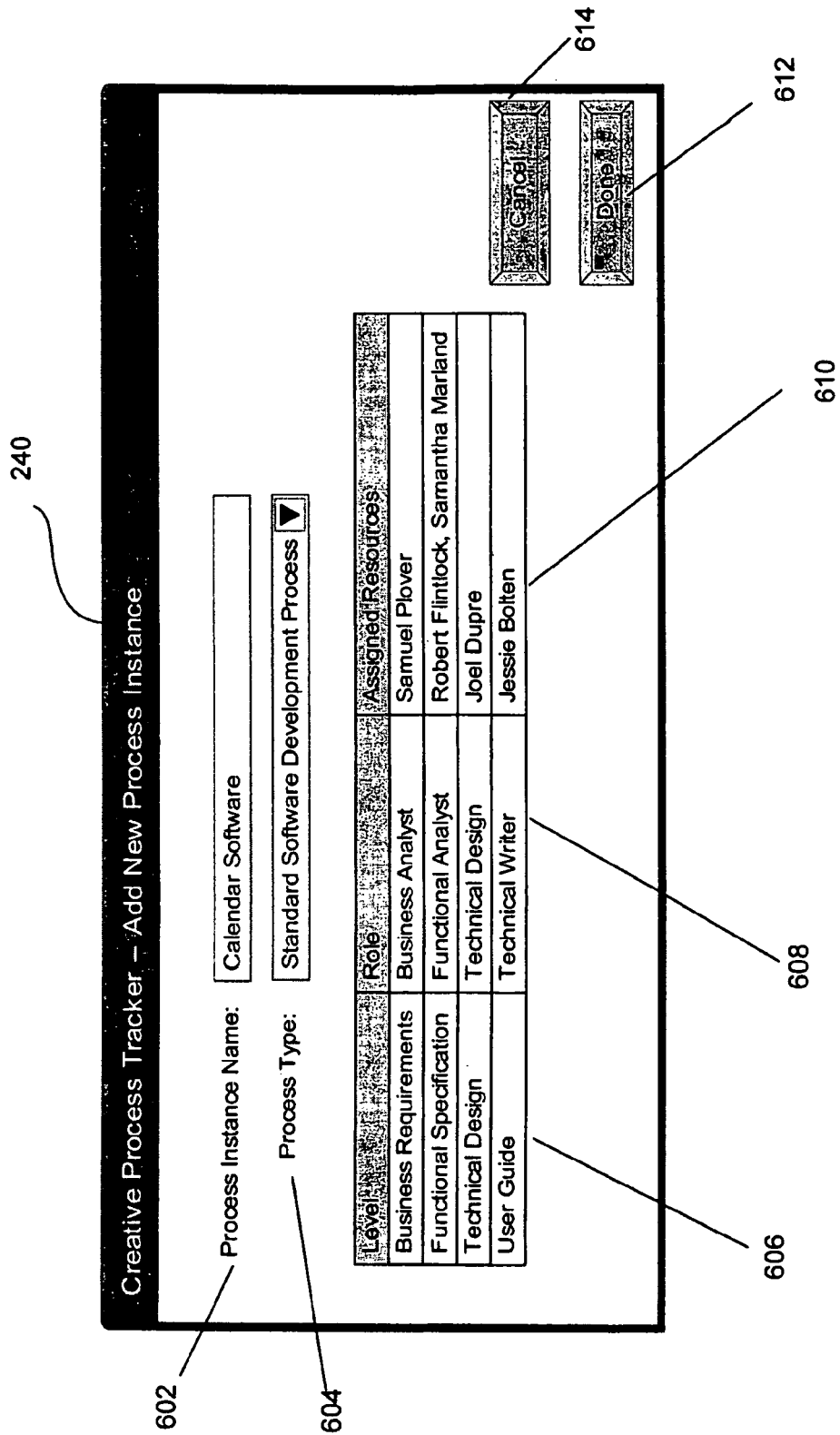
FIG. 6 is a diagram illustrating a user interface to add a new process instance in accordance with one embodiment.

FIG. 6 is a diagram illustrating a user interface to add a new process instance in accordance with one embodiment. UI 240 includes a field in which a user may input a process instance name 602 to identify the new process instance. UI 240 includes a field for the user to select a process type 604 for the new process instance. In general, process type 604 refers to a particular process, which has been defined, for example, as a process map via creative process modeler 210. Process type field 604 provides a user with an opportunity to select an existing process, or to create a new process. When the user selects an existing process type (e.g., "Standard Software Development Process" of FIG. 3), then UI 240 displays each defined level 606 of the selected process type in conjunction with its corresponding assigned role 608. UI 240 provides an entity with an opportunity to assign or specify resources 610 for each defined level 606 of the selected process type 604. Resources 610 indicate the entities that are responsible for each defined level 606 and role 608. Resource 610 may include a single entity, or a number of entities. As an example, the Business Requirements level includes a single entity (e.g., Samuel Plover) as a resource 610, while the Functional Specification level includes multiple entities (e.g., Rob Flintlock and Samantha Marland) as a resource 610.

Alternatively, if a user wishes to create a new process type, then the user will select "New" from the process type menu 604. Selecting "New" will direct a user to the process map UI 212, shown in FIG. 3, so that the user may define a new process.

UI 240 of FIG. 6 includes a cancel option 614, which may be selected any time. Cancel option 614 cancels the user's current attempt to create a new process instance in UI 240. In one embodiment, activating the "Add New Process Instance" button 510 of the process instance summary UI 230 may be the main way or only way to navigate to UI 240. Thus, a cancellation of an attempt to create a new process instance via cancel option 614 directs the user back to the process instance summary UI 230.

UI 240 of FIG. 6 includes option 612, which allows a user to submit a new process instance into the system. A user is able to incorporate the information from UI 240 into system 44 to create a new process instance by activating the "done" option 612. Creative process tracker 220 then directs the user to an updated process instance summary UI 230. Process instance summary UI 230 is updated to include the newly added process. Details of the newly added process may be obtained by clicking on a hyperlink 508 associated with a process name 502, which will provide direct access to a process instance UI 250, as shown in FIG. 7.

FIG. 7 illustrates a diagram of a process instance UI 250 in accordance with one embodiment. Process instance UI 250 provides a user with relevant information concerning a selected process instance. With process instance UI 250, a user can view the overall process, and track the creation of the product with respect to any set of levels of the process. In this example, process instance UI 250 displays a process instance of "Calendar Software," which is the first listed process instance shown in process instance summary UI 230 of FIG. 5.

Process instance UI 250 includes an overview region 710 and a detail region 720. Overview region 710 provides a general overview of a selected process instance. Overview region 710 includes a status map 712, corresponding to the selected process instance. Status map 712 is a process map that indicates a current overall status of each level of the selected process instance. Status map 712 may indicate the assigned resources, as defined, for example, in UI 240.

In FIG. 7, status map 712 indicates a status of each level by using a color-coded scheme. Overview region 710 may include a status key 714, which provides the details of the status indication scheme (e.g., color coded scheme) so that a user may easily glean the status from status map 712. In this example, a level may include one of the following statuses: "Level is Not Solved by Subsequent Levels," "Level is Partially Solved by Subsequent Levels," "Level is Completely Solved by Subsequent Levels," or "No Subsequent Levels."

Detail region 720 becomes populated with data when a number of adjacent levels are selected from overview region 710. In most cases, two adjacent levels are selected. In the example shown in FIG. 7, the Business Requirements level and the Functional Specification level have been selected.

Detail region 720 includes a component section 730. Component section 730 is populated with a table for each level that is selected. In this case, two levels have been selected, and thus component region 730 includes two side-by-side tables 732, 734. Typically, component region 730 displays a table 732, associated with the prior level, to the left of a table 734, associated with the subsequent level. Table 732 displays a list of components, associated with one of the selected levels (e.g. Business Requirements level). Table 734 displays a list of components, associated with the other selected level (e.g., Functional Specification level).

In one embodiment, the list of components, shown in table 732, is a comprehensive listing of all of the components of the first selected level. In addition, the list of components, shown in table 734, is a comprehensive listing of all of the components of the second selected level. The comprehensive listing includes all active components that are created for a level.

Other embodiments may be configured such that the list of components is a subset of the comprehensive listing of all components for the selected level. For example, in another embodiment, the list of components, shown in table 732, may be configured to display all components of the first selected level that are requirements and/or solutions for the second selected level. Likewise, the list of components, shown in table 734, may be configured to display all components of the second selected level that are requirements and/or solutions for the first selected level.

As shown in tables 732, 734, each level may include a number of distinct components. In general, anything that contributes to a description of a particular level may be considered a component of that level. For example, a particular level may include solutions embodied by an electronic document, and the components of this level may include sections of the electronic document.

Tables 732, 734 include a component number followed by a component name. Each component may be associated with a component author. Components are owned/authored by an entity, such as assigned resource 610. Several authors may contribute to components of a given level. By allowing collaboration, creative process tracker 220 is able to accommodate a number of different working environments, scenarios, and/or situations. For example, a Functional Design may be solved by a Technical Design involving multiple Technical Design Documents, each authored/owned by a separate entity. In such a case, each Technical Design may be defined by a group of components, which contribute to a complete solution provided by the Technical Design level.

Figure 10:
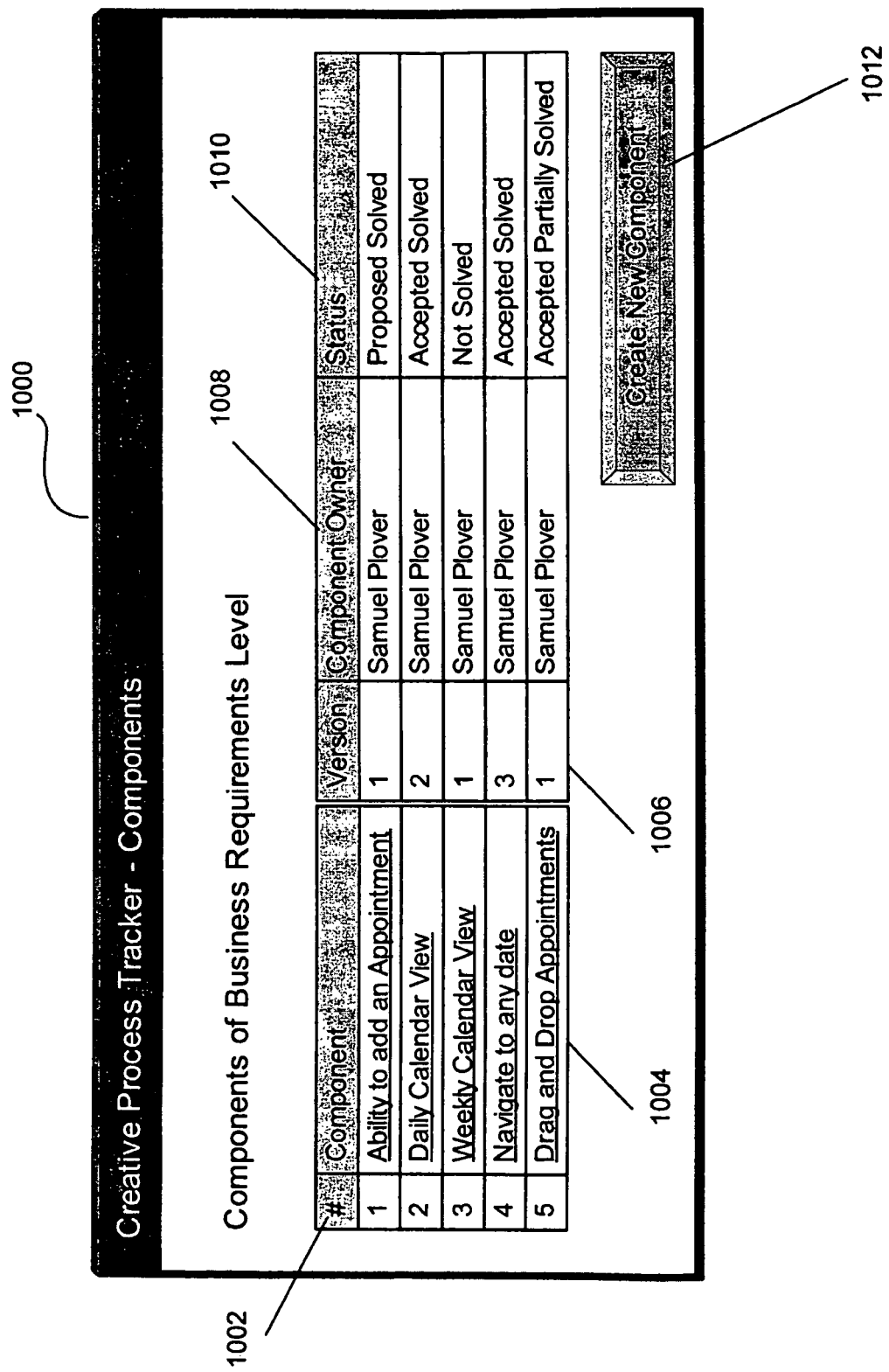
FIG. 10 is a diagram illustrating a user interface providing a summary of the components of a selected level in accordance with one embodiment.

Components may be edited by their respective component owners/authors. To edit a component, the user selects the edit components button 738a/738b, corresponding to the level of the component to be edited. Edit components button 738a allows the user to edit a component within the first selected level corresponding to table 732. Edit components button 738b allows the user to edit a component within the second selected level corresponding to table 734. When an edit components button (e.g., 738a or 738b) is selected, system 44 directs the user to a user interface, as shown in FIG. 10, in which the user may choose a component to be edited from a set of components, associated with the selected level.

Detail region 720 includes a relationship proposal section 740, which allows users to propose relationships between selected components of the selected levels. Specifically, relationship proposal area 740 allows a proposer to indicate if a proposed relationship between selected components, associated with the selected levels, is a "Full Solution" or a "Partial Solution."

System 44 defines these relationship types as follows:
Full Solution: A set of components from one level completely solves a set of components of another level; and
Partial Solution: A set of components from one level partially solves a set of components of another level.

To propose a new relationship, a proposer selects at least one component from each level. Selections can be made by clicking on a checkbox 736, corresponding to the component to be selected. As an example, when relationship #3, shown in relationship table 752, was created, Rob Flintlock selected a checkbox 736 for Business Requirement component #4 ("Navigate to any Date") from table 732 and selected a checkbox 736 for Functional Specification Requirement component #1 ("Calendar Navigation Widget") from table 734. Rob Flintlock then proposed that the "Calendar Navigation Widget" provides a full solution to the business requirement, associated with being able to "Navigate to any Date."

Creative process tracker 220 may apply restrictions such that only certain entities are able to propose relationships. For example, creative process tracker 220 may permit only component authors, involved in the relationship, to have the authority to propose a relationship. In the example shown in FIG. 7, creative process tracker 220 is configured such that only the Functional Analyst (e.g., "Rob Flintlock") is able to author a relationship proposing that a Business Requirement component is solved (e.g., "Full Solution") by a set of components in the Functional Design. In the default setting, the current user of the system 44 is specified as the proposer.

In one embodiment, system 44 may employ a RBAC system. System 44 may be configured such that only certain users are authorized to perform certain functions (e.g., proposing a relationship, accepting a relationship, and etc.) based on a number of factors, such as their assigned roles, their corresponding level, and whether they authored or contributed to the component. System 44 may allow for certain rules and restrictions to be employed in accordance with users' preferences and objectives.

Figure 8A:
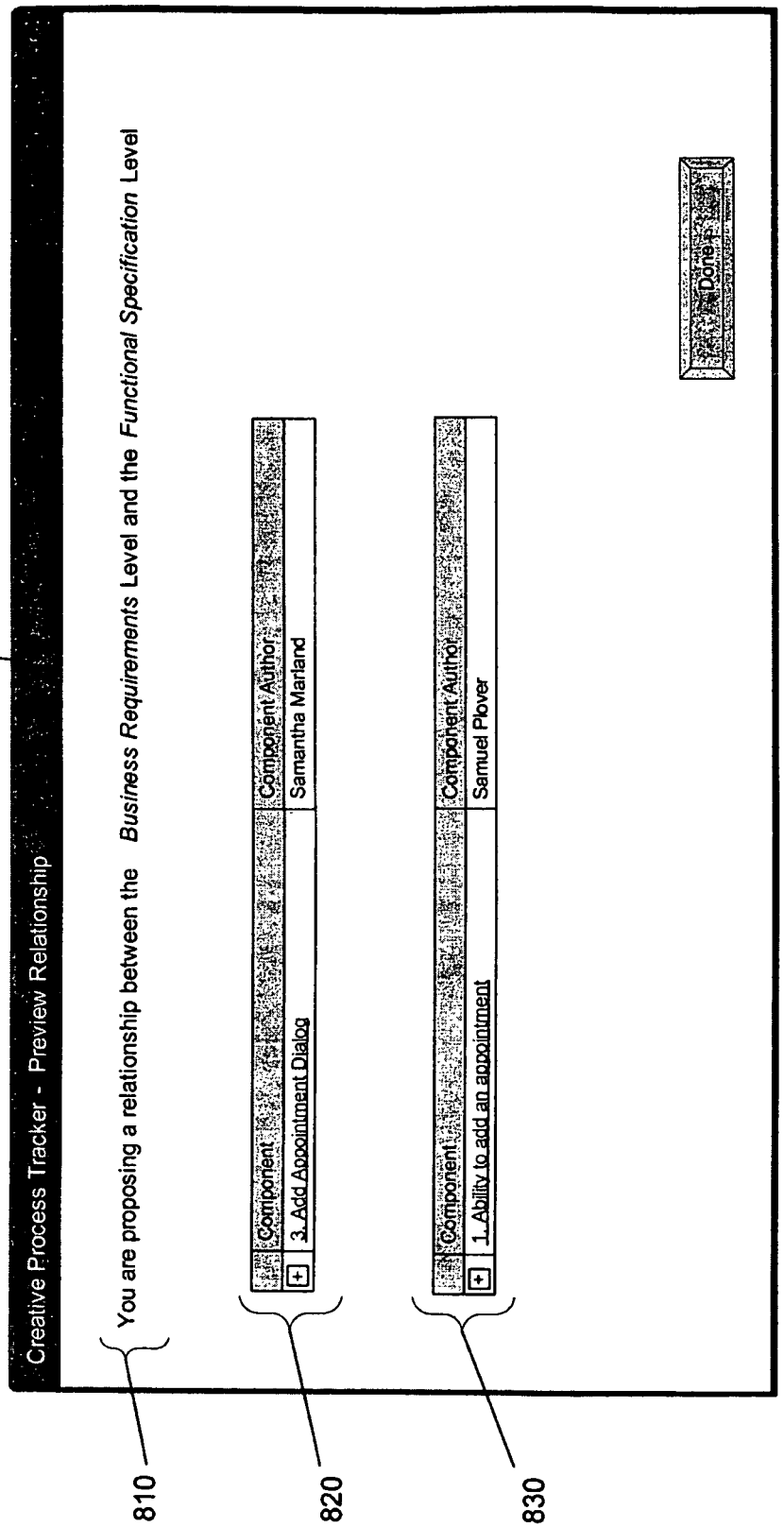
FIGS. 8A and 8B are diagrams illustrating a user interface to preview a relationship in accordance with one embodiment.
Figure 8B:
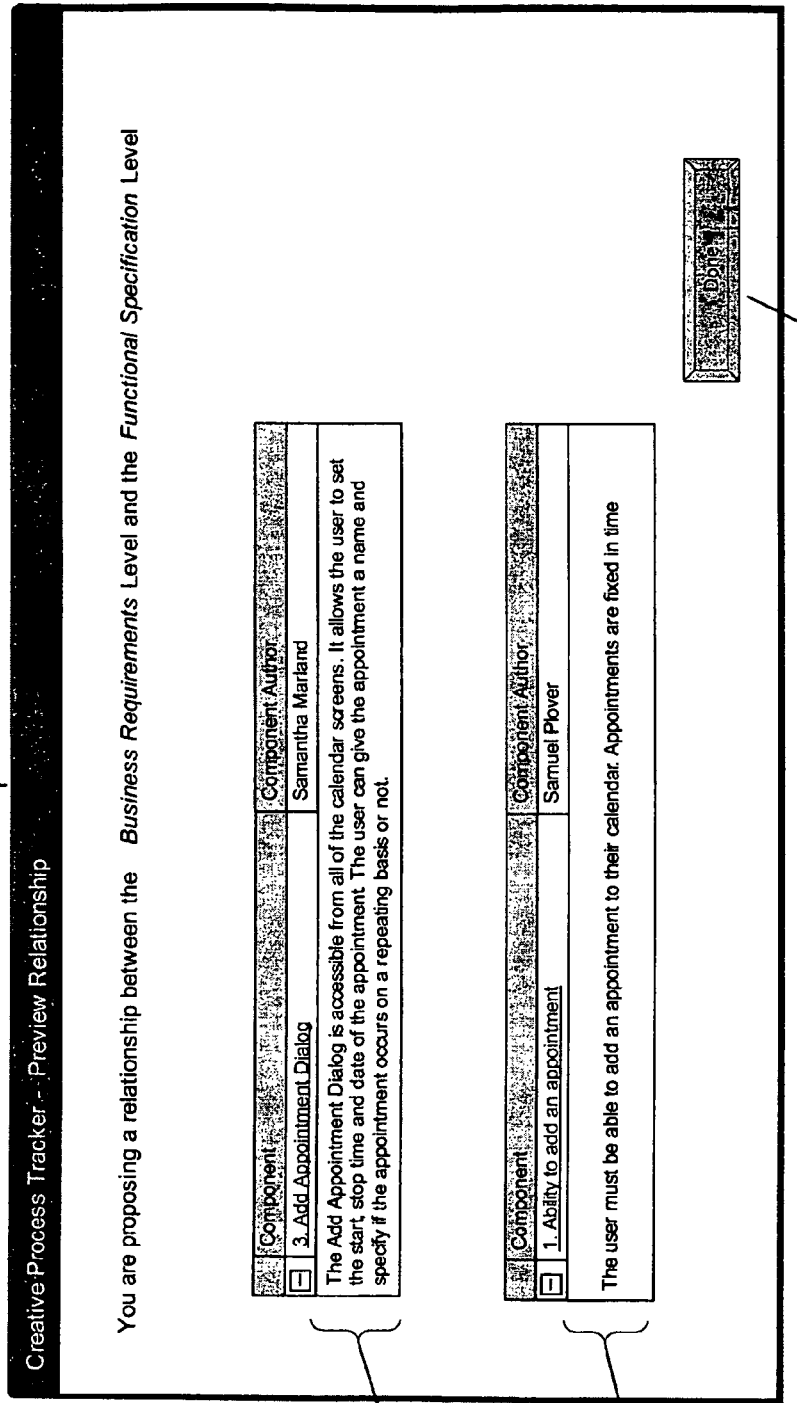

Process instance UI 250 allows the proposer to preview the relationship before formally submitting it into system 44 by selecting a preview option 744. Preview option 744 provides direct access to a UI that shows the actual contents of each of the components in the proposed relationship. In one embodiment, preview option 744 may provide direct access to a preview UI, as shown in FIGS. 8A and 8B. This preview UI provides a user with an opportunity to verify that the correct components have been selected and/or that the relationship is appropriately characterized. If the proposer would like to change one of his/her selections, then the proposer simply un-checks the incorrect selection from checkbox 736 and checks the appropriate selection on checkbox 736. When a new relationship is ready to be submitted, proposer activates a command button to create the proposed relationship 746.

Detail section 720 includes a relationship tracker 750. Relationship tracker 750 provides an entity with the ability to track any relationship, which has been submitted between components of the selected levels.

Once a relationship, associated with the selected levels, has been authored, the relationship is entered into a relationship table 752 and assigned a unique relationship number 756. Relationship number 756 uniquely identifies a particular relationship, defined by at least one component (e.g., a requirement) of one level, and at least one component (e.g., a solution to the requirement) of another level.

Relationship table 752 may include a mapping that indicates a relationship between at least one component of one level and at least one component of another level. For example, the mapping may include a listing of at least one component of the first selected level and a listing of at least one component of the second selected level. In FIG. 7, relationship table 752 includes a "Business Requirement Components" column and a "Functional Specification Components" column. In this instance, each component is identified by its component number. For example, component #1 ("Ability to add an appointment") of the business requirement level maps to components #1 ("Calendar Navigation Widget"), #2 ("Daily Calendar Screen"), and #3 ("Add Appointment Dialog") of the Functional Specification level. In other words, on Jan. 1, 2008, Samantha Marland proposed that components #1, 2, and 3 of the Functional Specification level represent a full solution to component #1 of the Business Requirement level. Additionally or alternatively, other mapping techniques may be utilized to illustrate the relationship between components of one level with respect to components of another level.

Relationship table 752 includes the current relationship type of each unique relationship. Relationship table 752 includes a status of each unique relationship. The status describes the current state of a defined relationship between at least one component of one level and at least one component of another level. For example, the status may indicate if a relationship is in a proposed state, an accepted state, or a rejected state. In the event that at least one component in a relationship has been modified, the status will be updated to indicate that a component has been modified (e.g., status="Proposed Components Modified"). In the event that a component in an accepted relationship has been modified, the status in the relationship table 752 will be reverted from an accepted state to a proposed state (i.e., from status="Accepted" to status="Proposed (Components Modified)").

Relationship table 752 includes a proposer and a proposal date for each unique relationship. Proposer indicates the entity that created or proposed the unique relationship. Proposal date indicates the date that a unique relationship was created.

In the event that a relationship is modified or a component is modified in a manner that affects the proposed relationship, then the relationship table 752 would be updated to reflect the modification. For example, if Rob Flintlock proposed a relationship and Samantha Marland later modified a component in that relationship, then the relationship table 752 would be updated. In this instance, the proposer would change from "Rob Flintlock" to "Samantha Marland." In addition, the proposal date would change from Rob Flintlock's proposal date to the date that Samantha Marland's modification was made. Additionally or alternatively, system 44 may include a relationship log that provides a full history of the relationship and tracks all related changes. For example, relationship log may include a record of the original proposer and original proposal date. In addition, relationship log may include a record of each subsequent modification date (e.g., timestamp), as well as the user that modified the components and/or relationships. The relationship log may include other relevant data and links regarding the relationship, as well as the components involved in the relationship.

Relationship table 752 includes an acceptor and an acceptance date for each unique relationship. An acceptor, generally, refers to an entity that is authorized to determine and accept a relationship as being a "partial solution" or a "full solution" in response to the relationship proposed by the proposer. In many cases, the component owner of the prior level, who had set forth the component requirements, is the authorized entity and the designated acceptor. An accepted state, in general, refers to an acceptor's acquiescence with the proposer's proposition that at least one component of a level adequately and sufficiently meets the requirements of at least one component of another level. Acceptance date indicates the date that the acceptor accepted the proposed relationship.

In the event that at least one component in an accepted relationship has been modified, the acceptor and the acceptance date may be deleted from relationship table 752 to indicate that the relationship has to be reviewed and accepted in view of the modified component. In one embodiment, system 44 may include a relationship log that includes a record of each acceptor and acceptance date in accordance with each modification. The relationship log is configured to provide a user with the ability to obtain relevant data regarding the history of a relationship, as well as any changes thereto.

Relationship table 752 includes a checkbox 754 in association with each unique relationship, which has been proposed and entered into system 44. Checkbox 754, when marked, may be used to select a relationship for deleting, viewing, accepting, or rejecting.

In FIG. 7, relationships may be modified indirectly. For example, a relationship may be modified by modifying at least one of the components (e.g., requirements and/or solutions) of the relationship. A relationship may also be modified by creating a new relationship and deleting, if necessary, the existing relationship. In one embodiment, system 44 may be enhanced to allow for relationships to be modified via an edit relationship button and an edit relationship user interface.

Relationship tracker 750 includes a delete relationship button 758, which allows an authorized entity to delete a relationship. In one embodiment, creative process tracker 220 may only allow relationships to be deleted by their corresponding proposers.

As discussed above, a relationship log may be maintained by system 44. When a relationship is deleted, the relationship log may indicate that the relationship has been deleted. This information may include a deletion timestamp, the user that deleted the relationship, the components of the relationship, and other relevant information. In addition, the relationship log (or a related user interface) may permit an authorized user (e.g., a relationship proposer) to undelete or reactivate a relationship in certain instances.

Figure 9A:
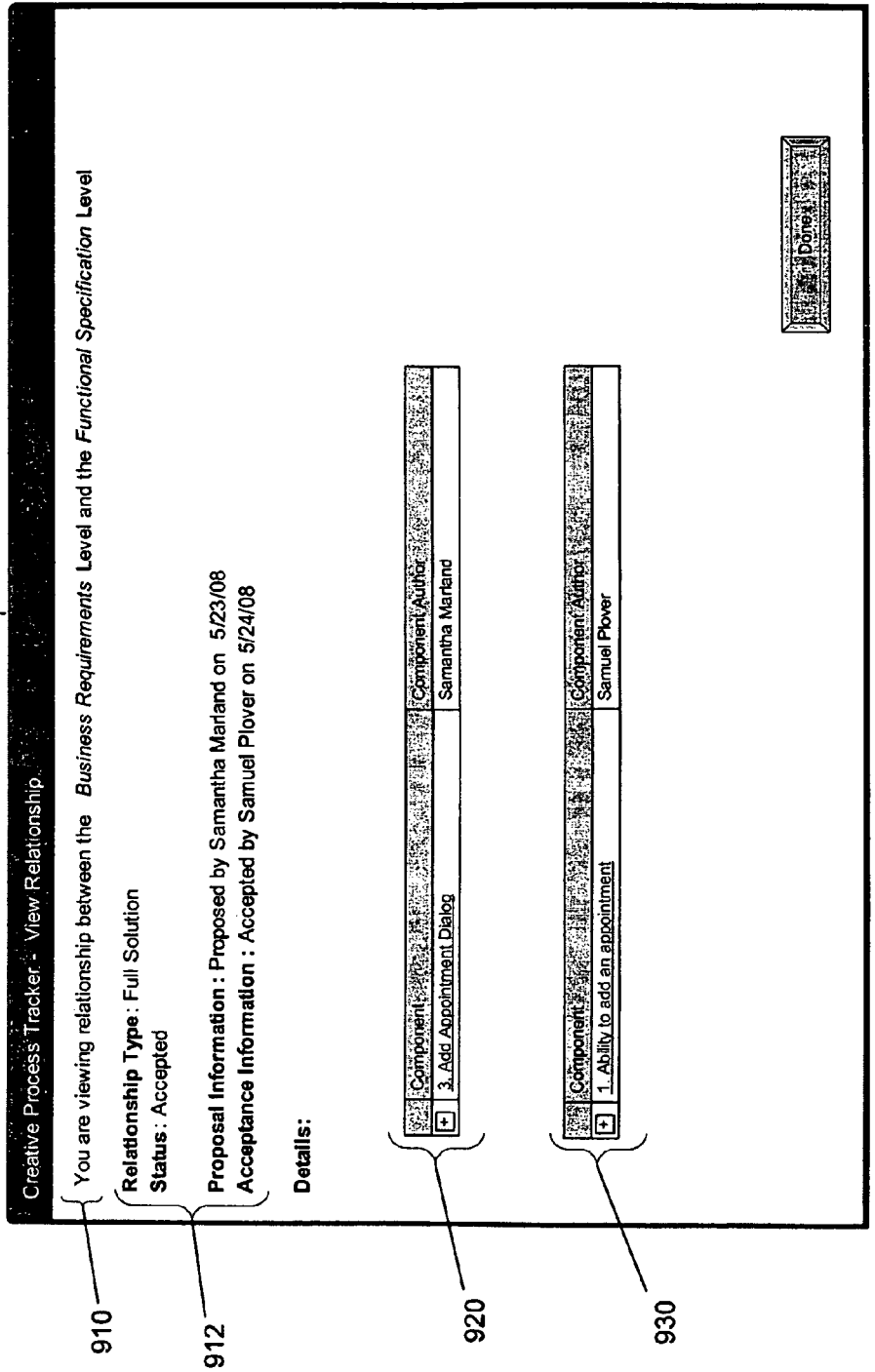
FIGS. 9A and 9B are diagrams illustrating a user interface to view a relationship in accordance with one embodiment.
Figure 9B:
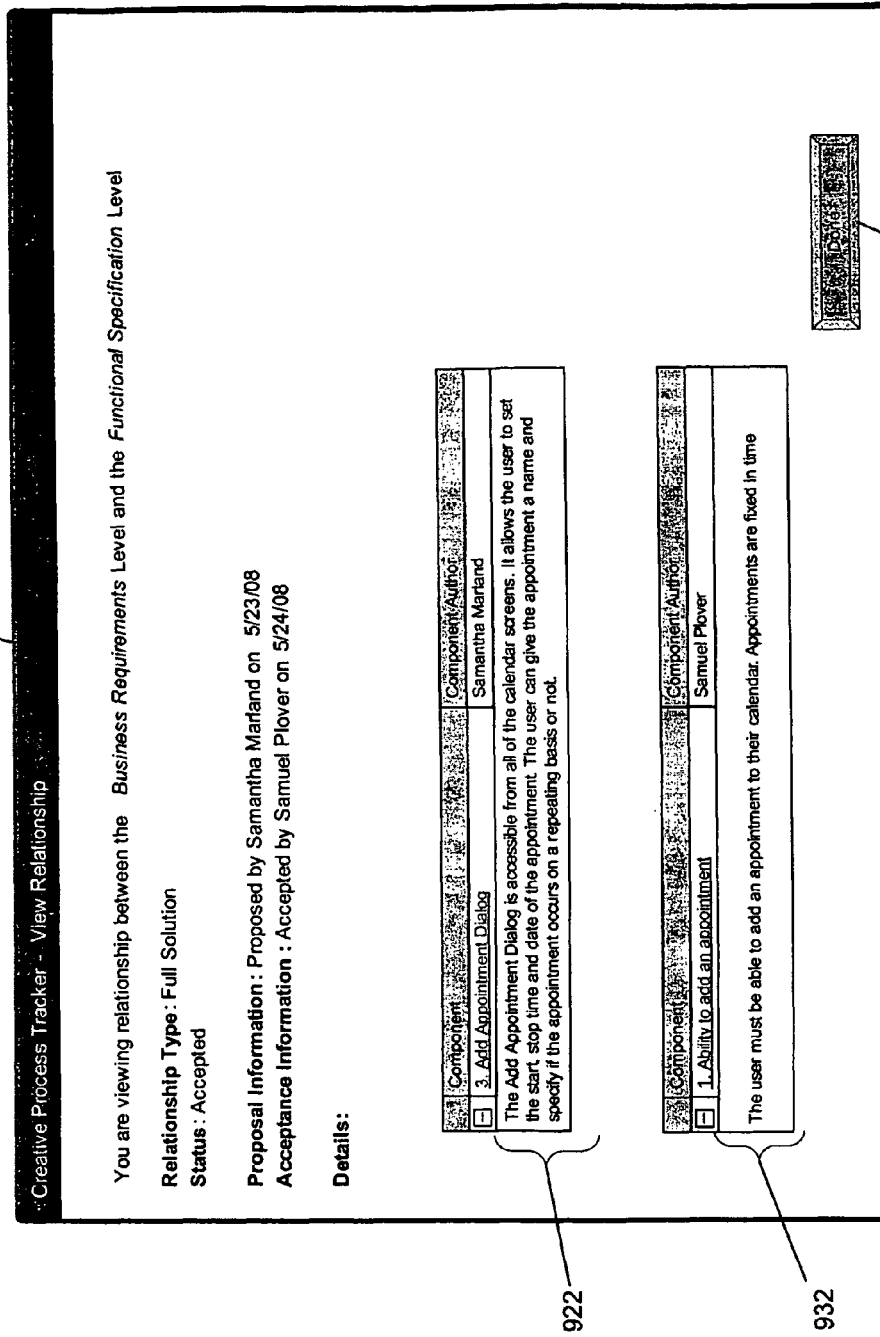

Relationship tracker 750 includes a view relationship button 760. When activated, view relationship button 760 provides direct access to a component UI, which shows the actual content of each of the components involved in a selected relationship. In one embodiment, the view relationship button 760 may provide direct access to UI 254, as shown in FIGS. 9A and 9B.

Relationship tracker 750 includes an accept button 762, which enables an acceptor to accept a proposed or modified relationship. In one embodiment, creative process tracker 220 may authorize this accepting functionality to only the appropriate component owners. In many cases, the appropriate component owner is a component author, who provides component requirements for an input level and seeks component solutions from another level.

Relationship tracker 750 includes a reject relationship(s) button 764. The rejection relationship(s) button 764 may be used to indicate that a relationship has been reviewed, but has not been accepted by the appropriate component owner.

FIGS. 8A and 8B illustrate a user interface that allows a user to preview a relationship in accordance with one embodiment.

Preview UI 252 includes information 810 regarding the relationship. For example, information 810 may indicate the levels, which are involved in the relationship. In FIGS. 8A and 8B, information 810 includes the following message: "You are proposing a relationship between the Business Requirements Level and the Functional Specification Level." Information 810 is configured to specify the appropriate levels that correspond to the components, which have been selected for the relationship.

Preview UI 252 displays the components that define the relationship. For example, preview UI 252 includes a component solution section 820 and a component requirement section 830. Component solution section 820 is configured to include at least one component. As shown in FIGS. 8A and 8B, a component solution may be identified by its component name (e.g., "Add Appointment Dialog"), component number (e.g., "#3"), and component author (e.g., "Samantha Marland").

Each component in the component solution section 820 may include a hyperlink (e.g., component name) that allows a user to view the actual contents of the component. The link may provide the content in a form that is suitable for the content type. For example, the link may provide access to a web browser that shows the component content (e.g., a document, a pdf, an image, an audio file, and etc.). Each component may include component details 822. Component details 822 may include information, such as a corresponding component description. Component details 822 may be a feature, which is collapsible and expandable. For example, FIG. 8A displays the component details 822 in collapsed form, while FIG. 8B displays the component details 822 in expanded form.

Similarly, component requirement section 830 is configured to include at least one component. As shown in FIGS. 8A and 8B, a component requirement may be identified by its component name (e.g., "Ability to add an appointment"), component number (e.g., "#1"), and component author (e.g., "Samuel Plover").

Each component in the component requirement section 830 may include a hyperlink (e.g., component name) that allows a user to view the actual component and its contents. The link may provide the content in a form that is suitable for the content type. For example, the link may provide access to a web browser that shows the component content (e.g., a document, a pdf, an image, an audio file, and etc.). Each component may include component details 832. Component details 832 may include information, such as a corresponding component description. Component details 832 may be a feature, which is collapsible and expandable. For example, FIG. 8A displays the component details 832 in collapsed form, while FIG. 8B displays the component details 832 in expanded form.

Preview UI 252 may include any relevant information regarding the relationship and/or any relevant information regarding the components involved in the relationship. For example, preview UI 252 may further include a relationship type field.

Preview UI 252 may include a button 840 (e.g., "Done" button) that directs the user to corresponding process instance UI 250.

FIGS. 9A and 9B illustrate a user interface that allows a user to view a proposed relationship, which has been established, in accordance with one embodiment.

View relationship UI 254 includes information 910 regarding the relationship. For example, information 910 may indicate the levels, which are involved in the relationship. In FIGS. 9A and 9B, information 910 includes the following message: "You are proposing a relationship between the Business Requirements Level and the Functional Specification Level." Information 910 is configured to specify the appropriate levels that correspond to the components, which have been selected for the relationship.

View relationship UI 254 may include additional information 912 regarding the relationship. For example, additional information 912 may include the relationship type, the status, proposal information, and acceptance information. In FIGS. 9A and 9B, the additional information 912 indicates that the relationship, proposed by Samantha Marland on May 23, 2008, is a full solution, which has been accepted by Samuel Plover on May 24, 2008.

View relationship UI 254 displays the components that define the relationship. For example, view relationship UI 254 includes a component solution section 920 and a component requirement section 930. Component solution section 920 is configured to include at least one component. As shown in FIGS. 9A and 9B, each component in component solution section 920 may be identified by its component name (e.g., "Add Appointment Dialog"), component number (e.g., "#3"), and component author (e.g., "Samantha Marland").

Each component in the component solution section 920 may include a hyperlink (e.g., component name) that allows a user to view the actual contents of the component. The link may provide the content in a form that is suitable for the content type. For example, the link may provide access to a web browser that shows the content (e.g., a document, a pdf, an image, an audio file, and etc.). Each component may include component details 922. Component details 922 may include information, such as a corresponding component description. Component details 922 may be a feature, which is collapsible and expandable. For example, FIG. 9A displays the component details 922 in collapsed form, while FIG. 9B displays the component details 922 in expanded form.

Similarly, component requirement section 930 is configured to include at least one component. As shown in FIGS. 9A and 9B, the component requirement may be identified by its component name (e.g., "Ability to add an appointment"), component number (e.g., "#1"), and component author (e.g., "Samuel Plover").

Each component in the component requirement section 930 may include a hyperlink (e.g., component name) that allows a user to view the actual component and its contents. The link may provide the content in a form that is suitable for the content type. For example, the link may provide access to a web browser that shows the component content (e.g., a document, a pdf, an image, an audio file, and etc.). Each component may include component details 932. Component details 932 may include information, such as a corresponding component description. Component details 932 may be a feature, which is collapsible and expandable. For example, FIG. 9A displays the component details 932 in collapsed form, while FIG. 9B displays the component details 932 in expanded form.

In this particular case, FIGS. 9A and 9B display an instance in which a user is viewing relationship #1 at a later date than when process instance UI 250, which is shown in FIG. 7, was viewed. This is made evident by additional information 912, as well as component solution section 920 and component requirement section 930. In the earlier instance, relationship #1 was proposed on Jan. 1, 2008 and defined by component #1 of the Business Requirement level and components #1, 2, and 3 of the Functional Specification level, as shown in relationship section 750 of FIG. 7. In the later instance, relationship #1 was re-proposed on May 23, 2008, as shown in FIGS. 9A and 9B. In this later instance, relationship #1 is defined by component #1 of the Business Requirement level and components #3 of the Functional Specification level. As shown in FIGS. 9A and 9B, the relationship proposer (e.g., "Samantha Marland") modified relationship #1 to provide component #3 of the Functional Specification level as the only component solution to component #1 of the Business Requirement level. In this case, Samantha Marland may have deleted components #1 and #2 from proposed relationship #1 of Jan. 1, 2008.

View relationship UI 254 may include a button 940 (e.g., "Done" button) that directs a user to corresponding process instance UI 250.

Figure 11:
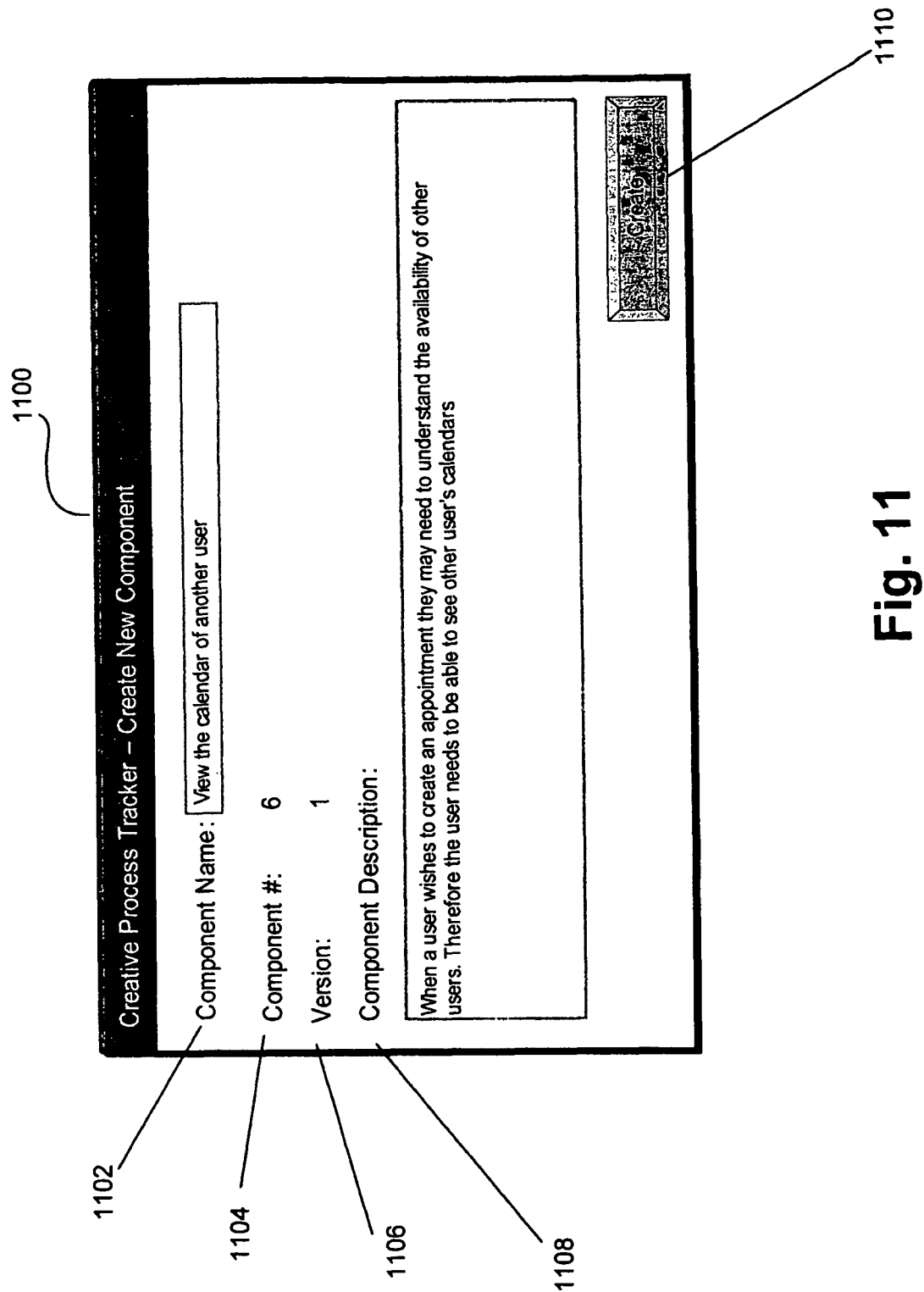
FIG. 11 is a diagram illustrating a user interface to create a new component in accordance with one embodiment.

FIGS. 10-12 illustrate a number of component UIs 260 that may be associated with system 44. Component UIs 260 provide a user with the ability to view components, create new components, modify existing components, and delete components.

Components may be defined inline or reference a set of external sources, or be a mixture thereof. For example, if the component is simply plain text, component UIs provide some facility for entering text directly into the component UIs. If the component is a section of a document, a whole web page, or a fragment of a web page, then a component UI may be implemented such that an entity may select a link or reference to that externally defined object. If the component content cannot be entered into the component UI and is not easily referenced, the component UI may be implemented such that an entity may note a label for the component. As an example, an entity may enter the label, "Section 5 of the Functional Specification," in the event that the entity cannot enter or provide a link for the component content. Although it is recognized that a component may include an internal or external source, FIGS. 11-12 illustrate a simplified example in which text describing the component is entered into the component UI.

FIG. 10 is a diagram illustrating a UI 1000, providing a summary of the components of a level in accordance with one embodiment. UI 1000 allows an entity to view all of the components of a selected level. An entity may navigate to UI 1000 by selecting the edit components option 738 of FIG. 7, corresponding to one of the selected levels. Additionally or alternatively, an entity may navigate to UI 1000 by selecting (e.g., double clicking) a level from status map 712 via process instance UI 250. Each component 1004 may include a hyperlink, which may direct the user to UI 1200 of FIG. 12.

In association with each component 1004, UI 1000 displays the unique component number 1002, the component version number 1006, the component owner 1008, and the component status 1010. In this instance, component status 1010 is a combination of the relationship status and the relationship type.

As discussed, in one embodiment, UI 1000 displays a comprehensive listing of all of the components of a selected level. In the example shown in FIG. 10, UI 1000 illustrates a component summary of the Business Requirements Level. Since Samuel Plover is the assigned resource of the Business Requirements Level, Samuel Plover is listed as the component owner for each listed component of this level. In addition, in this example, UI 1000 illustrates that component requirements #2 and #4 have been completed ("Accepted Solved"). Component #3 indicates a "Not Solved" status, which means that no solution has been proposed for creating a weekly calendar view.

As another example, if the Functional Specification level was selected to be displayed in UI 1000, then UI 1000 would display a comprehensive listing of all of the components of the Functional Specification. The comprehensive listing of the components for the Functional Specification may include all components solutions for the Business Requirement level, as well as all component requirements for the User Guide level and the Technical Design level.

UI 1000 includes a button 1012, which allows a user to navigate to UI 1100, shown in FIG. 11, to create a new component.

FIG. 11 is a diagram illustrating a UI 1100 to create a new component in accordance with one embodiment. UI 1100 includes a field for an entity to specify a component name 1102, which identifies the component and/or its function. UI 1100 may also require the user to submit a corresponding component description 1108 that further describes the component, a requirement of the component, or the component's function/solution. Although UI 1100 discloses an example in which the component is defined by a component description, the component may be defined inline or reference a set of external sources, as discussed above.

System 44 automatically assigns a unique component number 1104 to the new component, which will be created upon activating a create button 1110. The unique component number 1104 may be used throughout system 44 when referring to the component, as illustrated, for example, in FIGS. 7-12. UI 1100 displays this unique component number 1104 in association with the component. UI 1100 may further indicate the version number 1106 of the component. Version number 1106 indicates if the component has undergone any revisions, as well as the number of times that it has been modified. In the default setting, when creating a new component via UI 1100, system 44 assumes that it is the first version and that the component owner/author is the current user of the system 44. Additionally or alternatively, when creating the component, UI 1100 may permit the user to specify the component owner or the component author of the particular component being created.

As an example, FIG. 11 illustrates the creation of component #6. In this case, Samuel Plover is the current user of system 44 and the authorized component author because he owns the Business Requirements Level. Samuel Plover decides that the Calendar Software needs to be able to allow users to see each other's calendars in certain instances. Therefore, Samuel Plover creates a component named, "View the calendar of another user." System 44 assigns a unique component number to the component. In this case, the unique component #6 is assigned because five other components have already been created in the Business Requirements level (FIG. 7). In addition, since this component does not refer to a previous version, UI 1100 indicates that this component is the first version. UI 1100 also provides the user with a field to input a component description. In this case, Samuel Plover enters the following component description: "When a user wishes to create an appointment, the user may need to understand the availability of other users. Therefore the user needs to be able to see other user's calendars."

Once the component name and the component description have been entered, the user may integrate the new component into the system. For example, this newly created component may be entered into the system upon activating a create button 1110, provided on UI 1100. System 44 stores the date that the first version was created and updates the Business Requirements Level to include component #6 in every appropriate instance. System 44 allows the component author and any authorized individual to edit a component after it has been created.

FIG. 12 is a diagram of a UI 1200 to edit a component in accordance with one embodiment. A user may navigate to UI 1200 by selecting and/or activating a hyperlink, which corresponds to a particular component 1004 of UI 1000. UI 1200 provides an editing window 1210, a component history window 1220, and a relationship tracking window 1230 so that the user may view and assess the impact of any modifications that may be made during the component editing process.

Editing window 1210 permits a component author or authorized entity to modify the component and save it as a new version. The layout of the editing window 1210 may be similar to the layout of UI 1100 to create a new component (FIG. 11). Editing window 1210 includes a copy of a selected version of the component that is to be modified. In many cases, the most recent version of the component is the selected version.

Component history window 1220 provides a listing of a set of versions of the selected component. In the default setting, component history window 1220 provides a complete listing of all versions. For each listed version, the component history includes other information relevant to the version, such as the version number, the component author, and the date the version was created.

Relationship tracking window 1230 shows all of the relationships that involve the particular component to be edited. For example, relationship tracking window 1230, as illustrated in FIG. 12, includes the unique relationship number 1232. Each unique relationship number 1232 may include a hyperlink, which provides direct access to view relationship UI 254 of FIGS. 9A and 9B. In association with each unique relationship number 1232, relationship tracking window 1230 may include information similar to that found in relationship table 752 of FIG. 7 for each unique relationship number 732. For example, for each unique relationship involving the selected component, relationship tracking window 1230 may show the mapping between level components. The mapping may include at least one component from a prior level and at least one component from a subsequent level. For each unique relationship, relationship tracking window 1230 may include the relationship type, the status, the proposer, the proposal date, the acceptor, and the acceptance date.

When modifying a component in the editing window 1210, a user has the ability to view the relationships that may be affected by a modification being made to the component by, for example, the relationship tracking window 1230. This allows an entity to consider the impact an edit or change to the component would have on other components, other user(s), and the creative process itself.

In addition to being able to edit a component, a component owner may have the ability to delete a component. When a component is deleted, system 44 treats the component as if the component were modified and/or edited. For example, system 44 would indicate that the deleted component has been 'touched' and any relationship involving the component would need to be revalidated.

In one embodiment, when a component is deleted, the component is not necessarily purged from the system. Instead, the deleted component may include a status and/or flag to indicate that it has been deleted. In this case, the deleted component will continue to be viewable in any logs (e.g., relationship log, component history, and etc.), which are maintained by system 44. System 44 may be configured to include a feature to hide/unhide deleted components in certain scenarios and/or in certain UIs.

In addition to the UIs discussed above, creative process tracker 220 includes a component change detection module 270 (FIG. 2). Component change detection module 270 detects any changes, which are made to a process instance. For example, component change detection module 270 is able to detect a change in an underlying component. Changes may be reflected by the version number of a component, and tracked by creative process tracker 220. As a result, system 44 is able to provide an entity with the ability to see the impact of changes at one level in relation to the other levels involved in a process instance, and to be notified of these changes.

To illustrate, when a component of a given level is updated, the relationships it may have with components of other levels are consulted. Relationships that are affected are 'touched,' which means that they need to be revalidated before they can be fully reinstated. For instance, as indicated in process instance UI 250 of FIG. 7, this may result in a previously "Accepted" relationship becoming a "Proposed (Components Modified)." In some cases, depending upon the nature of the relationships, a change to one level may indirectly affect a number of levels, and not just the subsequent level.

Creative process tracker 220 includes a recertification notification module 280 (FIG. 2). When changes to the prior level are detected, and relationships are 'touched,' recertification notification module 280 may send notifications to at least the component proposers indicating that the component requirements, and certain relationships (if the relationship still stands) have changed. When changes to the subsequent level are detected, and relationships are "touched," recertification module may send notifications to at least the component owners indicating that they need to reaccept the relationship (if the relationship still stands).

Creative process tracker 220 may include scenario analysis tools 290. Scenario analysis tools 290 are configured in a manner that allows a user to test various scenarios without having to make any lasting changes to the system. Scenario analysis tools 290 may include a number of scenario analysis UIs. The scenario analysis UIs may be configured to be substantially similar to process instance UI 250 of FIG. 7 with respect to its layout.

In one embodiment, creative process tracker 220 may include a link, which navigates a user to scenario analysis UI. For example, a start scenario button may be included in process instance UI 250. Upon activating the start scenario button, creative process tracker 220 may display a window (or dialog) that requests the user to enter a name for the scenario. The scenario name may be used to refer to the scenario analysis being performed with respect to the process instance, which was displayed in process instance UI 250. Upon submitting the scenario name, creative process tracker 220 will be in scenario mode. The scenario name, as well as a scenario mode indicator, may be displayed on the corresponding scenario analysis UIs. For example, the scenario name and scenario mode indicator may be positioned substantially near the top of the scenario analysis UIs. Once in scenario mode, a user may make any component changes (e.g., create a component, modify a component, and etc.) or modify any relationships (e.g., add a relationship, remove a relationship, and etc.) while allowing the user to visualize the consequences of those actions. Creative process tracker 220 may also include a stop scenario button. Activating the stop scenario button saves the current scenario for future reference and takes the user back to normal mode.

Scenario analysis tools 290 may include comparison user interfaces that allow a user to compare and/or contrast a number of different scenarios and/or process instances. In general, the comparison user interfaces allow a user to compare every detail of a scenario and/or process instance that is selected for comparison. For example, the comparison user interfaces may allow a user to compare a scenario with the current process instance, or another scenario. These comparison user interfaces may further generate and provide any relevant comparison data regarding the selected process instances and/or selected scenarios. To illustrate, scenario analysis tools 290 may communicate or interact with a functional module 46 (e.g., project management software) to permit a user to compare the total amount of work (e.g., workload, or working hours) between a number of selected scenarios and/or selected process instances.

As discussed, scenario analysis tools 290 allow an entity to experiment with different scenarios by allowing an entity to change certain components or change certain aspects of components to temporarily to see the upstream/downstream effects of those changes. For example, an entity might remove a component from the Business Requirements level to see how much of the construct is no longer required. As another example, an entity might remove a single piece of the construct to see which components and/or relationships of the Business Requirements level are impacted.

Figure 13:
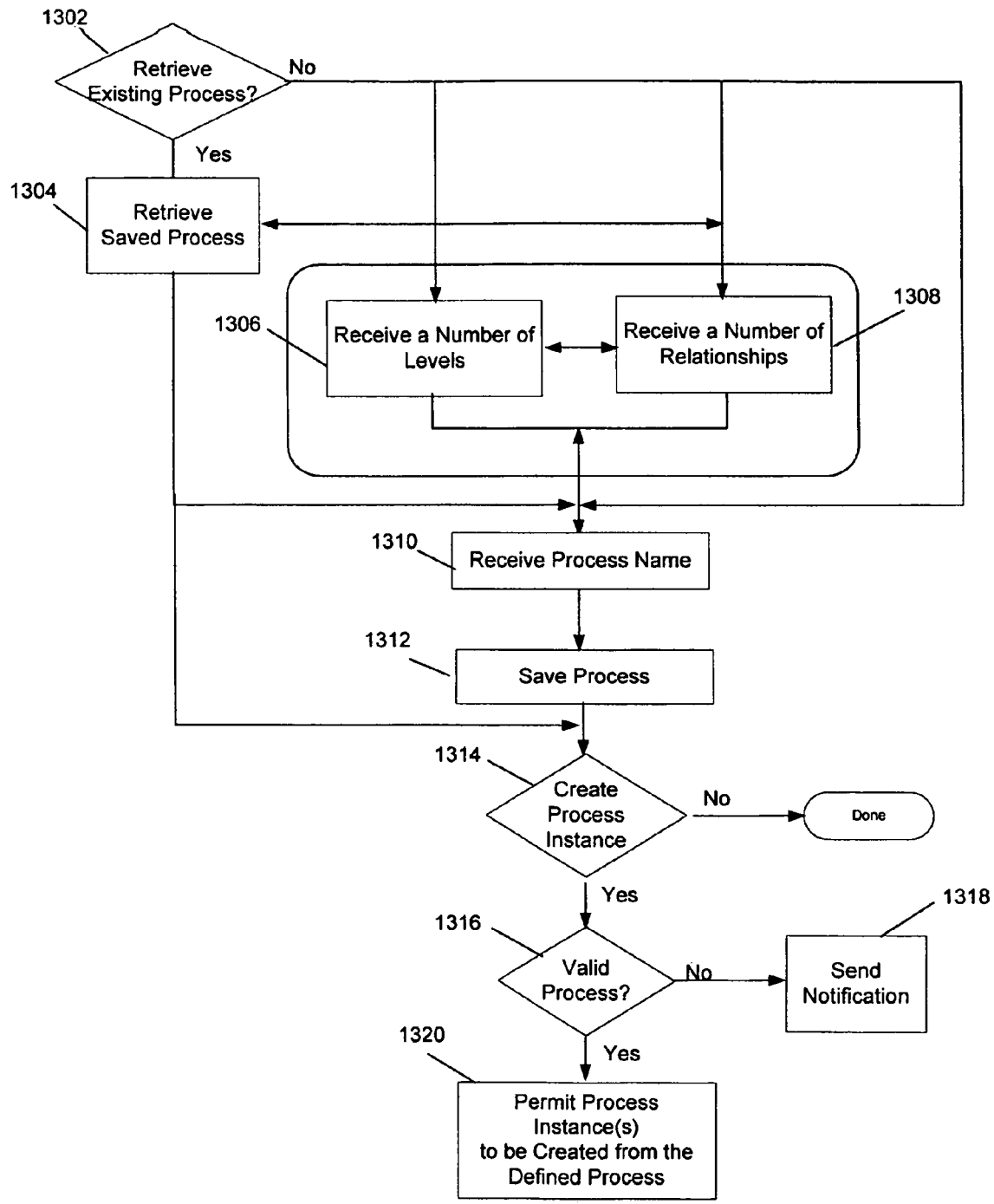
FIG. 13 is a flow diagram illustrating a process of creating a process map in accordance with one embodiment.

FIG. 13 illustrates a flow diagram associated with defining a process in terms of a number of entities (i.e., levels) and a number of relationships, which exist between entities in accordance with one embodiment. In one embodiment, the functionality of the flow diagram of FIG. 13, and FIG. 14 below, is implemented by software stored in memory or other computer readable or tangible media, and executed by a processor. In other embodiments, the functionality can be performed by hardware (e.g., through the use of an application specific integrated circuit ("ASIC"), a programmable gate array ("PGA"), a field programmable gate array ("FGPA"), etc.), or any combination of hardware and software.

At 1302, it is determined if there has been a request to retrieve an existing process. If a user does not want to retrieve an existing process, then the functionality allows the user to create a process at 1306 and/or 1308. If a user would like to retrieve an existing process, then the functionality continues to 1304.

At 1304, the functionality determines the process that the user wants to retrieve, and retrieves it. In some cases, the user might want to retrieve an existing process to finish defining the existing process. In other cases, the user might want to retrieve an existing process to use it as a template for creating a new process. Whatever the case, once it is determined that an existing process will be retrieved, then the functionality retrieves the process and provides it to the user.

At 1306, the functionality receives a number of levels, which define the entities associated with the process. Each level is set up to be defined with respect to an entity name, and a general role. The functionality allows the user to define a number of levels. A number of levels may be defined at any time, as shown in FIG. 13.

At 1308, the functionality receives a number of relationships, which define a known relation or association between entities (i.e., defined levels). Each relationship is set up to be defined such that an entity/level that sets forth the requirements is connected to the entity/level that is responsible for solving the requirements. The functionality allows the user to define a number of relationships. A number of relationships may be defined at any time, as shown in FIG. 13.

At 1310, the functionality receives a process name. The user may provide a descriptive label as the process name. If the functionality does not receive a process name, and the process needs to be saved, then the functionality will provide a process name for the process by default. A process name may be designated at any time before the process is saved, as shown in the flow diagram.

At 1312, the functionality saves the process. The process may be saved at predetermined time periods, or upon a user's request to save the process.

At 1314, the functionality may receive a request to create a process instance from a saved process. If a request is not received, then the functionality is done. If a request is received, then the functionality determines if the process definition is valid at 1316.

At 1316, the functionality determines if the process is valid. In this case, since the process is defined in terms of a process map, the functionality determines if the process map is valid. The functionality may determine that the process map is valid based on a number of conditions. For example, these conditions may include determining if every entity/level is involved in at least one relationship, and determining that every relationship includes an entity, which is configured to set requirements, and an entity, which is configured to receive these requirements and is responsible for providing the solutions to the requirements.

If the process is not valid, then the functionality proceeds to 1318. If the process is deemed valid, then the functionality proceeds to 1320.

At 1318, upon determining that the process is not valid, the functionality sends a notification to the appropriate entities. In many cases, the appropriate entity is the entity or user that created the process, or the entity or user that is attempting to create a process instance from the saved process. The notification indicates that the process map is not a valid process. The notification may further highlight why the particular process is not valid, or why a process instance may not be created based thereupon.

At 1320, the functionality permits a number of process instances to be created from the defined process. A process instance may include a number of relationships, which map a solution, proposed by one level, to a requirement, specified by another level.

Figure 14:
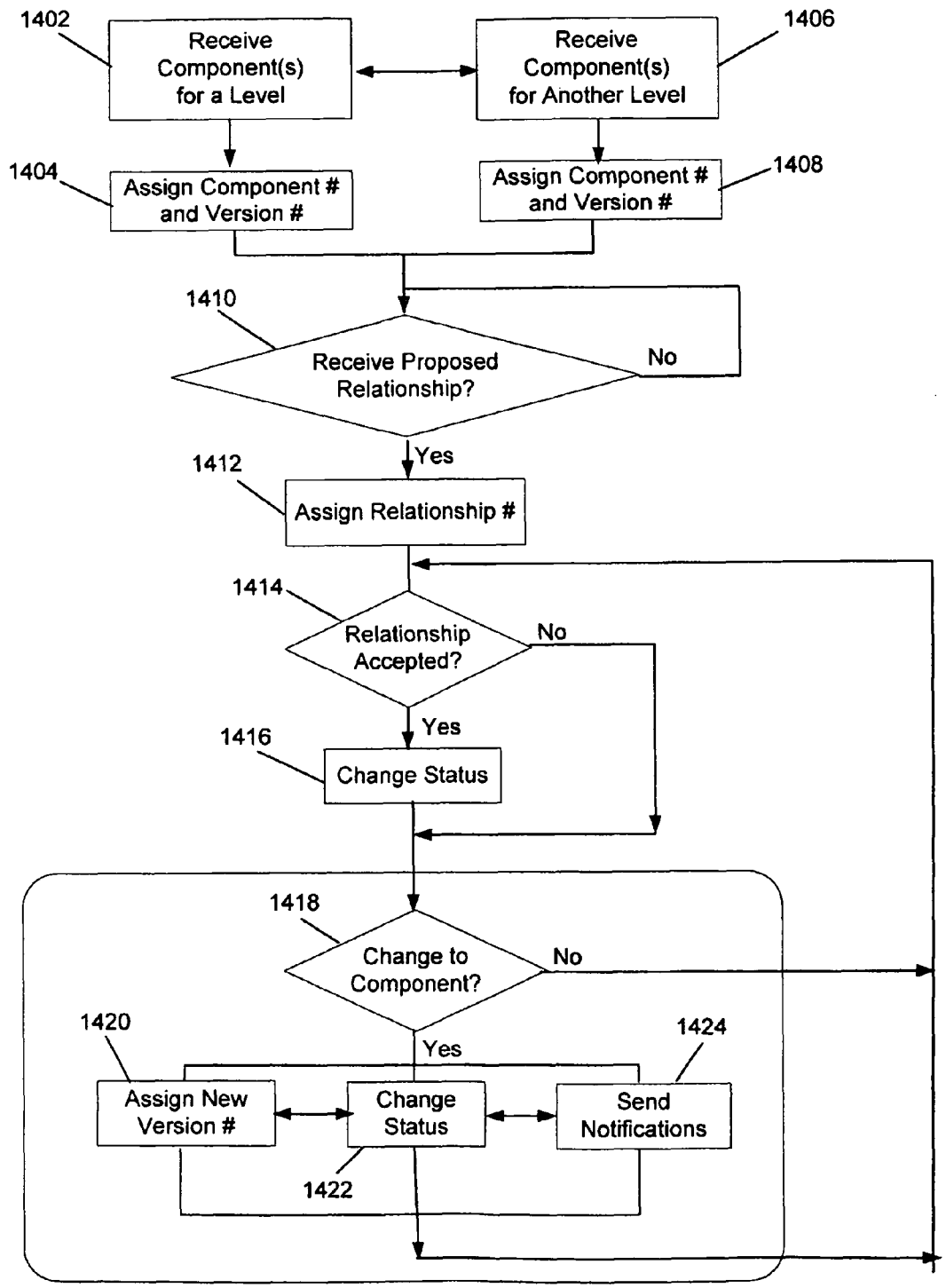
FIG. 14 is a flow diagram illustrating a process of defining and tracking a solution, proposed by one level, to a requirement, specified by another level, in accordance with one embodiment.

FIG. 14 is a flow diagram illustrating a process of defining and tracking a solution, proposed by one level, in relation to a requirement, specified by another level, in accordance with one embodiment.

At 1402, the functionality receives a number of components for a level.

At 1404, the functionality assigns a component number and a version number for every component that it receives at 1402.

At 1406, the functionality receives a number of components for another level.

At 1408, the functionality assigns a component number and a version number for every component that it receives at 1406.

At 1410, it is determined if a relationship has been received (and/or defined) with respect to any of the components of a prior level and any of the components of a subsequent level. The prior level may be the level referred to in 1402, and the subsequent level may be the level referred to in 1406. Alternatively, the prior level may be the level referred to in 1406, and the subsequent level may be the level referred to in 1402.

If a relationship has not been received and/or defined between at least one component of a prior level and at least one component of a subsequent level, then the functionality continues to check for a relationship between these two levels, or continues to wait for a relationship to be received.

If a relationship has been received and/or defined between at least one component of a prior level and at least one component of a subsequent level, then the functionality proceeds to 1412.

At 1412, a relationship number is assigned to the relationship, which was defined/proposed at 1410.

At 1414, it is determined if the relationship, which was proposed/defined at 1410, has been accepted. If the relationship has been accepted, then the functionality proceeds to 1416. If the relationship has not been accepted, then the functionality proceeds to 1418.

At 1416, the relationship status for the relationship is updated to indicate that the relationship has been accepted.

At 1418, it is determined if any of the component(s), involved in the relationship, defined at 1410, have been changed. If none of the component(s), involved in the relationship, have been changed, then the functionality continues to determine if the relationship has been accepted by returning to 1414. If at least one of the component(s), involved in the relationship, have changed, then the functionality proceeds to 1420, 1422, and 1424. 1420, 1422, and 1424 may be performed in any order, or may be performed simultaneously, as indicated in FIG. 14.

At 1420, a new version number is assigned to each component that has changed.

At 1422, the functionality updates the relationship status, if necessary, to indicate that at least one component, involved in the relationship, has been modified. For example, if the relationship was previously accepted, then the relationship status changes from an "Accepted" state to a "Proposed (Components Modified)" state.

At 1424, a notification is sent to each appropriate entity. The notification informs each entity, which may be affected, about the change. In many instances, the system may be configured to notify each component author/owner that is involved in the relationship.

As disclosed, one embodiment includes a system that enables an entity to define a process. A process may be defined with respect to the entities involved in a process, and any relationships that may exist between the entities. A number of process instances may be created from the process.

Once defined, a given process instance may be tracked. Upon detecting a change to a process instance, system updates any relevant information, and notifies all appropriate entities of each detected change.

System 44 provides entities with the ability to define a process, as well as the ability to layout each entity's requirements and/or solutions, while also keeping track of any changes during the development of the product. System 44 provides an entity with the ability to check the status of any requirement and/or solution at any given point in time. In addition, system 44 allows entities to view the actual content and/or materials, which are presented as requirements and/or solutions at any point in time. By providing the above-mentioned features, system 44 is able to ensure that the final solution meets the initial problem requirements.

Further, system 44 provides impact analysis, making the development process more agile and allowing the development process to react to changing customer requirements during a development cycle. System 44 is enabled to provide impact analysis based on a proposed change at any level in the solution chain. System 44 allows entities to run various proposed changes and scenarios on the process before deciding to implement these changes. For example, during the development of a software product, entities, involved in the process, would have the ability to imagine what impact removing things from the build would have on the software product and/or product development process, without having to actually implement these changes. In addition, should any changes be implemented, system 44 may be set up to automatically notify the appropriate or relevant entities, which may be affected or which may need to be aware of any changes to the overall product, or the product development process.

System 44 provides entities with the ability to ensure that related documents are synchronized. For example, system 44 is configured to prevent instances in which a solution is not updated based on upstream and/or downstream changes. In addition, system 44 provides entities with the ability to prevent instances in which a solution may be signed off at a given time, but changed at a later time without appropriate re-approval.

System 44 allows users to define their own processes, and does not force users to use a particular process or change their processes. For example, if a number of documents represent the product, then users may continue to represent certain aspects of these documents as components, using the system 44.

System 44 provides entities with efficiency gains, by minimizing rework due to late discovery of omissions from a solution. System 44 holds entities, involved in a process, accountable for distinct components of the overall product.

System 44 provides entities with the ability to check the progress of a process in real-time at any location. This makes it possible for multiple entities to work together in developing a product, but at locales that are suitable for each entity. Thus, system 44 enables travel and associated expenses, which typically occur during formal handoffs and meetings, to be minimized.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to:
   receive a process comprising a plurality of levels;
   create a first process instance from the defined process, the first process instance comprised of a plurality of first process entities;
   permit the first process instance to be tracked based at least on requirements and solutions that are specified by the first process entities in the first process instance;
   wherein the first process instance comprises an assignment of one or more first users for each of the first process entities and determines a status of each of the first process entities;
   wherein each level comprises one or more components, and each component contributes to a description of its corresponding level, and the process comprises a plurality of relationships between components on different levels; and
   allow an assigned user of a first component to propose a new relationship to assigned users of selected components at different selected levels, and tracking for later retrieval the proposed new relationship including a proposal date and an acceptance date wherein each component comprises an associated hyperlink that when selected provides a content of the component;
   provide a first link in association with a first process name identifying the first process instance, the first link providing access to detailed information regarding selected components of the first process instance, the detailed information comprising:
   a status map to provide an overall status of each component of the selected process instance, the status map being a graphical representation of the defined process;
   a listing of a set of requirements of a first selected component and a listing of a set of solutions of a second selected component;
   a listing of a set of component relationships involving the first selected component and the second selected component, wherein each component relationship indicates proposed solutions of the second selected component to the requirements of the first selected component;
   a listing of a status of each of the component relationships within the set of component relationships; and
   an indication as to whether each of the component relationships within the set of component relationships have been approved, wherein an approval date is provided in association with each approved component relationship.

2. The computer readable medium of claim 1, further comprising allowing a component to be edited by a component user, wherein the edited comprises proposing the new relationship between selected components of selected levels.

3. The computer readable medium of claim 1, wherein the instructions further cause the processor to:
   provide a first link in association with a first process name identifying the first process instance, the first link providing access to detailed information regarding selected entities of the first process instance.

4. The computer readable medium of claim 3, wherein upon receiving a change to the first process instance, the instructions further cause the processor to:
   update a first overall status upon determining that the first overall status is not reflective of the first process instance including the change; and
   update the detailed information to reflect the change to the first process instance.

5. The computer readable medium of claim 4, wherein the instructions further cause the processor to:
   send a notification to each entity affected by the change, the notification includes information regarding the change, and any updates to the detailed information resulting from the change to the first process instance.

6. The computer readable medium of claim 1, wherein the instructions further cause the processor to:
   receive a scenario involving a temporary change to at least one component of the first process instance;
   preview a first overall status to reflect the first process instance in view of the temporary change to a component;
   preview the detailed information to reflect the temporary change to the first process instance and compare a total amount of work between a number of selected scenarios; and
   permit the first overall status and the detailed information to revert to a state prior to receiving the scenario upon receiving a request.

7. A collaborative system for developing a product, the system comprising:
   a process map user interface that enables a process for developing the product to be defined in terms of multiple entities, wherein the multiple entities include a first entity that is responsible for providing at least one component requirement to a second entity, wherein the second entity is responsible for providing at least one component solution to the first entity;
   component user interfaces that enable each entity to create, modify, and track component requirements or component solutions associated with a process instance of the process, wherein the process instance comprises an assignment of one or more users for each of the entities;
   a process instance user interface that enables the second entity assigned users to review the at least one component requirement of the first entity and propose the at least one component solution to the first entity assigned users, the process instance user interface enables the first entity assigned users to review the at least one component solution of the second entity assigned users and accept the at least one component solution in response to the at least one component requirement; and
   a component change detection module that detects changes to the at least one component requirement and the at least one component solution of the process instance, wherein the first and second entities are notified of any detected changes, wherein the component change detection module comprises a processor executing instructions stored on a storage device;
   wherein the process comprises a plurality of levels and each level comprises one or more components, and each component contributes to a description of its corresponding level, and the process comprises a plurality of relationships between components on different levels;
   further allowing an assigned user of a first component to propose a new relationship to assigned users of selected components at different selected levels, the proposed new relationship, and tracking for later retrieval the proposed new relationship including a proposal date and an acceptance date, wherein each component comprises an associated hyperlink that when selected provides a content of the component;
   wherein the process instance user interface provides a first link in association with a first process name identifying the first process instance, the first link providing access to detailed information regarding selected components of the first process instance, the detailed information comprising:

a status map to provide an overall status of each component of the selected process instance, the status map being a graphical representation of the defined process;

a listing of a set of requirements of a first selected component and a listing of a set of solutions of a second selected component;

a listing of a set of component relationships involving the first selected component and the second selected component, wherein each component relationship indicates proposed solutions of the second selected component to the requirements of the first selected component;

a listing of a status of each of the component relationships within the set of component relationships; and an indication as to whether each of the component relationships within the set of component relationships have been approved, wherein an approval date is provided in association with each approved component relationship.

8. The system of claim 7, further comprising:

a scenario analysis user interface that enables the first and second entities to visualize effects of various changes to either the component requirement or the component solution that is expected to occur to the process instance without having to implement the various changes to the process instance.

9. A computer implemented method for tracking a process for developing a product, said method comprising:

storing by a processor a process map, the process map defines a process with respect to multiple levels, each level includes an entity that is responsible for creating a number of component requirements and/or a number of component solutions for another level; and tracking by the processor a status of each component requirement or solution at any specified point in time for a process instance of the process, wherein the process instance comprises an assignment of one or more users each of the entities;

updating by the processor the status in accordance with any changes that are made to any of the component requirements or solutions; and notifying any relevant entities, which are affected by a change to the component requirement or the component solution, upon detecting the change to a component requirement or component solution;

wherein each level comprises one or more components, and each component contributes to a description of its corresponding level, and the process comprises a plurality of relationships between components on different levels;

allowing an assigned user of a first component to propose a new relationship to assigned users of selected components at different selected levels, and tracking for later retrieval the proposed new relationship including a proposal date and an acceptance date, wherein each component comprises an associated hyperlink that when selected provides a content of the component;

providing a first link in association with a first process name identifying the first process instance, the first link providing access to detailed information regarding selected components of the first process instance, the detailed information comprising:

a status map to provide an overall status of each component of the selected process instance, the status map being a graphical representation of the defined process;

a listing of a set of requirements of a first selected component and a listing of a set of solutions of a second selected component;

a listing of a set of component relationships involving the first selected component and the second selected component, wherein each component relationship indicates proposed solutions of the second selected component to the requirements of the first selected component;

a listing of a status of each of the component relationships within the set of component relationships; and an indication as to whether each of the component relationships within the set of component relationships have been approved, wherein an approval date is provided in association with each approved component relationship.

10. The system of claim 7, further comprising limiting, based on assigned roles, users that are allowed to propose the new relationship.

11. The system of claim 8, the scenario analysis user interface further enabling a comparison of a total amount of work between a number of selected scenarios.

12. The method of claim 9, further comprising limiting, based on assigned roles, users that are allowed to propose the new relationship.

13. The method of claim 9, further comprising providing a comparison of a total amount of work between a number of selected scenarios of process instances.

14. The computer readable medium of claim 1, wherein each relationship is defined as either a full solution that comprises a first set of components from one level that completely solves a second set of components from a second level, or a partial solution that comprises a first set of components from one level that partially solves a second set of components from a second level.

15. The system of claim 7, wherein each relationship is defined as either a full solution that comprises a first set of components from one level that completely solves a second set of components from a second level, or a partial solution that comprises a first set of components from one level that partially solves a second set of components from a second level.

16. The method of claim 9, wherein each relationship is defined as either a full solution that comprises a first set of components from one level that completely solves a second set of components from a second level, or a partial solution that comprises a first set of components from one level that partially solves a second set of components from a second level.

* * * * *

UNITED STATES PATENT AND TRADEMARK OFFICE
CERTIFICATE OF CORRECTION

PATENT NO. : 9,047,575 B2  
APPLICATION NO. : 12/435209  
DATED : June 2, 2015  
INVENTOR(S) : Ioannou Page 1 of 1

It is certified that error appears in the above-identified patent and that said Letters Patent is hereby corrected as shown below:

In the specification

Column 9, line 62, delete ""Proposed Components Modified)")." and insert
-- "Proposed (Components Modified)"). --, therefor.

In the claims

Column 23, line 33, Claim 9, after "requirements" delete "and/or" and insert -- or --, therefor.

Column 23, line 39, Claim 9, before "each" insert -- for --.

Signed and Sealed this
Sixteenth Day of February, 2016

Michelle K. Lee
*Director of the United States Patent and Trademark Office*